(12) United States Patent
Yano et al.

(10) Patent No.: US 9,081,231 B2
(45) Date of Patent: Jul. 14, 2015

(54) VERTICAL ALIGNMENT MODE LIQUID CRYSTAL DISPLAY

(75) Inventors: Kentaro Yano, Hachioji (JP); Shigeki Oka, Kunitachi (JP); Ayako Inagaki, Tachikawa (JP); Yuki Kaneko, Hachioji (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 974 days.

(21) Appl. No.: 13/256,407

(22) PCT Filed: Feb. 12, 2010

(86) PCT No.: PCT/JP2010/052049
§ 371 (c)(1),
(2), (4) Date: Sep. 13, 2011

(87) PCT Pub. No.: WO2010/106855
PCT Pub. Date: Sep. 23, 2010

(65) Prior Publication Data
US 2012/0002143 A1    Jan. 5, 2012

(30) Foreign Application Priority Data

Mar. 18, 2009   (JP) .................................. 2009-066238

(51) Int. Cl.
*G02F 1/13363* (2006.01)
*G02F 1/1337* (2006.01)
*G02B 5/30* (2006.01)

(52) U.S. Cl.
CPC ........ *G02F 1/133634* (2013.01); *G02B 5/3083* (2013.01); *G02F 2001/133637* (2013.01);

(Continued)

(58) Field of Classification Search
CPC ................................................ G02F 1/133634
See application file for complete search history.

(56) References Cited

U.S. PATENT DOCUMENTS

| 2009/0122243 A1* | 5/2009 | Sugiyama et al. ............. 349/118 |
| 2009/0153782 A1* | 6/2009 | Fukagawa et al. .............. 349/96 |
| 2009/0207347 A1* | 8/2009 | Shimizu et al. ................. 349/96 |

FOREIGN PATENT DOCUMENTS

| JP | 10-186354 A | 7/1998 |
| JP | 10-312166 A | 11/1998 |

(Continued)

*Primary Examiner* — Dennis Y Kim
(74) *Attorney, Agent, or Firm* — Lucas & Mercanti, LLP

(57) ABSTRACT

A vertical alignment mode liquid crystal display comprising: a liquid crystal cell; a first polarizer; a second polarizer; a first optical film arranged between the first polarizer and the liquid crystal cell; and a second optical film arranged between the liquid crystal cell and the second optical film, wherein the first and the second optical films each are a resin film having an optically biaxial property, the first and the second optical films meet: Formula (1) $Ro_1 > Ro_2$; Formula (2) $Rth_1 < Rth_2$; Formula (3) $DSP_{Ro1} < DSP_{Ro2}$; and Formula (4) $DSP_{Rth1} < DSP_{Rth}$, wherein $Ro_1$ and $Ro_2$ represent in-plane retardation values of the first and the second optical films, respectively, $Rth_1$ and $Rth_2$ represent retardation values in the thickness direction of the first and the second optical films, respectively, and $DSP_{Ro1}$, $DSP_{Ro2}$, $DSP_{Rth1}$ and $DSP_{Rth2}$ represent wavelength dispersion properties of $Ro_1$, $Ro_2$; $Rth_1$ and $Rth_2$, respectively.

10 Claims, 1 Drawing Sheet

(52) U.S. Cl.
CPC . *G02F2001/133742* (2013.01); *G02F 2202/40* (2013.01); *G02F 2413/02* (2013.01); *G02F 2413/12* (2013.01)

(56) References Cited

FOREIGN PATENT DOCUMENTS

| | | |
|---|---|---|
| JP | 11-133413 A | 5/1999 |
| JP | 2000-131693 A | 5/2000 |
| JP | 2003-270442 A | 9/2003 |
| JP | 2004-326089 A | 11/2004 |
| JP | 2005-049792 A | 2/2005 |
| JP | 2006-030688 A | 2/2006 |
| JP | 2006-515686 A | 6/2006 |
| JP | 2009-048157 A | 3/2009 |
| WO | 03-032060 A1 | 4/2003 |
| WO | WO 2006070936 A1 * | 7/2006 |
| WO | WO 2006132404 A1 * | 12/2006 |
| WO | WO 2008004451 A1 * | 1/2008 |

* cited by examiner

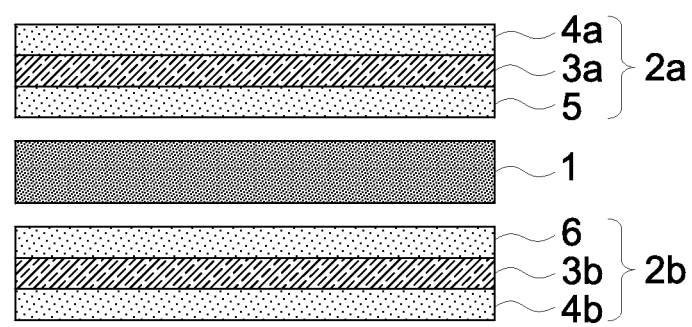

VERTICAL ALIGNMENT MODE LIQUID CRYSTAL DISPLAY

CROSS REFERENCE TO RELATED APPLICATION

This is a 371 of PCT/JP2010/052049 filed Feb. 12, 2010, which in turn claimed the priority of Japanese Patent Application No. 2009-066238 filed Mar. 18, 2009, both of the applications are incorporated by reference herein.

FIELD OF THE INVENTION

The present invention relates to a vertical alignment mode (hereafter, abbreviated to a VA mode) liquid crystal display, and, in more detail, relates to a VA mode liquid crystal display in which coloring which occurs in a black display due to light leakage is suppressed, and excellent front contrast, and excellent properties regarding color shift and viewing angle are achieved.

BACKGROUND ART

Needs for liquid crystal displays for the application to such as an LCD television and a personal computer display have expanded. Usually, a liquid crystal display is constituted of a liquid crystal cell formed by sandwiching transparent electrodes, a liquid crystal layer, a color filter and so on with glass plates, and two polarizing plates provided on both surfaces of the liquid crystal cell. The polarizing plates each have a structure in which a polarizer (also referred to as a polarizing membrane, or a polarizing film) is sandwiched with two optical films (also referred to as polarizing plate protective films).

Various kinds of liquid crystal displays having different display modes have been developed so far. For example, there have been known a twisted nematic mode (also referred to as a TN mode), a super-twisted nematic mode (also referred to as an STN mode), an in-plain switching mode (also referred to as a transverse electric field mode or an IPS mode), and a vertical alignment mode (also referred to as a vertical alignment mode or a VA mode).

Specifically, as a display mode for large sized liquid crystal displays such as a large sized monitor or a liquid crystal television, the VA mode which enables a high display speed and an excellent front contrast is becoming a dominant display mode. In a vertical alignment mode liquid crystal display such as a VA mode liquid crystal display, the long axis of a liquid crystal material is vertically aligned against the substrate face when no voltage is applied. Accordingly, a vertical alignment mode liquid crystal display has a feature that, when a liquid crystal display is viewed from a vertical direction against the substrate, a nearly perfect black display is attained, whereby a high contrast is obtained.

However, the vertical alignment mode liquid crystal display has a problem that coloring in a black display due to light leakage, or reduced contrast is observed when the display is viewed from an oblique direction. This problem is ascribed, as one of the possibilities, to the retardation (also referred to as a retardation) in the thickness direction of the liquid crystal layer itself used in the liquid crystal cell. Further, it is also considered to be because the transmission axes of two polarizing plates provided on both surfaces of the liquid crystal cell and arranged in a crossed Nicol condition crosses perpendicularly when the display is viewed from the front direction, however, when the display is viewed from an oblique direction, the apparent crossing angle of the transmission axes deviate from 90°.

In order to over come the problem that coloring in a black display due to light leakage is observed, there have been known a technique in which a uniaxial negative birefringent optical compensation film having retardation in the thickness direction (also referred to as a C plate) is employed to compensate the retardation in the thickness direction of the liquid crystal layer used in the liquid crystal cell (refer to Patent Document 1). Also, there has been known a technique in which a uniaxial positive birefringent optical compensation film (A plate) is employed (refer to Patent Documents 2 and 3). Accordingly, in principle, it is expected that the retardation in a vertical alignment mode liquid crystal display can be compensated by employing such uniaxial optical compensation films in combination. Although the above disclosed optical compensation films are effective to compensate retardation for a specified wavelength of light, the effect is not fully enough for light of a wavelength other than the specified wavelength and, also, there has been a problem that coloring in a black display due to light leakage, or reduced contrast is observed when the display is viewed from an oblique direction.

In order to overcome this problem, it is necessary to provide an optical compensation function not only at a specific wavelength but also in all over the visible light region. Therefore, in order to compensate the apparent shift of the axes of the polarizers, optical compensation may be conducted to light of shorter wavelength and longer wavelength as equally as possible by using an A plate which exhibits a larger in-plane retardation when the wavelength becomes longer, namely, a reverse wavelength dispersion of the in-plane retardation. In general, the retardation in the thickness direction of the liquid crystal layer used in the liquid crystal cell of a VA mode liquid crystal display exhibits no wavelength dependence (namely, the wavelength dispersion of the retardation value is flat) or the retardation in the thickness direction becomes larger when the wavelength becomes shorter (namely, a normal wavelength dispersion). Accordingly, it is desirable to use an optical compensation film which exhibits a larger retardation in the thickness direction when the wavelength is increased, namely, the retardation in the thickness direction exhibits a normal wavelength dispersion (C plate) to compensate the retardation in the thickness direction of the liquid crystal layer. Also, proposed has been a technique to use two uniaxial films to compensate the retardation not only at a specific wavelength, but also in all over the visible light region (for example, refer to Patent Document 4). Namely, in this technique, it is expected that optical compensation in a wide wavelength range can be attained by employing an A plate which is a uniaxial optical compensation film having an in-plane retardation, in which the in-plane retardation exhibits reverse wavelength dispersion, and a C plate which is a uniaxial optical compensation film having a retardation in the thickness direction, in which the retardation in the thickness direction exhibits normal wavelength dispersion. However, it is very difficult to produce an optically uniaxial optical compensation film as described above employing a resin material commonly used for a polarizing plate protective film, such as a cellulose ester film, and it is necessary to use a material having a large photoelastic coefficient to produce a uniaxial film using a resin. Therefore, unevenness in a retardation value tends to occur, and as the results, suppression of light leakage in an oblique direction becomes difficult. A uniaxial film formed from such a material generally exhibits poor adhesion with a polyvinylalcohol resin commonly used as a polarizer, and it tend to be difficult to directly adhere with such a polarizer, and, when it is directly adhered with a polarizer, unevenness in retardation tends to occur, which also results in occurrence of light leakage. Accordingly, a conventionally used polarizing plate protective film has also been necessary between a uniaxial film and a polarizer, which has been a problem because of increase in the thickness of a liquid crystal display and a manufacturing cost. Also, there has been known a technique to form an optical compensation layer by applying a liquid crystal layer on a resin substrate of such as a cellulose ester resin, followed by orienting. However, this technique also results in problems, for example, a thicker liquid crystal display panel and a higher manufacturing cost due to a complicated manufacturing process.

As a countermeasure to these problems, an optical compensation film having a uniform retardation, and which can provide a thinner liquid crystal panel can be easily manufactured as an optical compensation film by employing a biaxial resin film prepared by providing a prescribed retardation function to a resin film which has been commonly used as a polarizing plate protective film (for example, refer to Patent Document 5). However, it has been difficult to obtain a single biaxial resin film which enables sufficient optical compensation of a VA mode liquid crystal display apparatus. Accordingly, there has been proposed a technique to employ two biaxial resin films sandwiching a liquid crystal cell, each biaxial resin film being constituted of a cellulose ester film which also has a function of a polarizing plate protective film and is provided with a prescribed retardation value, to provide a necessary optically compensating function to a VA mode liquid crystal display as well as to reduce the thickness of the liquid crystal display, whereby the manufacturing process becomes simpler (for example, refer to Patent Document 6). However, according to the technique disclosed in Patent Document 6, there has been a problem that the in-plane retardation and the retardation in the thickness direction have similar features in wavelength dispersion, since the optical compensation is carried out by using the in-plane retardation and the retardation in the thickness direction exhibited by each of the two biaxial optical compensation films. Namely, while mutually different wavelength dispersions are necessary to compensate the apparent misalignment of the axes and the retardation in the thickness direction of a liquid crystal cell in all over the visible light region, faced has been a problem that it is difficult to independently control the in-plane retardation value and the retardation value in the thickness direction. For example, when the in-plane retardation is controlled to show reverse wavelength dispersion in order to compensate the apparent misalignment of the axes of the polarizers, the retardation in the thickness direction also shows reverse wavelength dispersion, which is contrary to the desired wavelength dispersion for the for the retardation of the liquid crystal layer of the liquid crystal cell, whereby compensation over a wide wavelength range becomes difficult. Alternatively, when the retardation in the thickness direction is controlled to show flat or normal wavelength dispersion, the in-plane retardation also shows similar wavelength dispersion, whereby compensation of the misalignment of the axes over a wide wavelength range becomes difficult. Thus, it has been difficult to effectively compensate the apparent misalignment of the axes of the polarizers and the retardation in the thickness direction of the liquid crystal layer used in a liquid crystal cell in all over the visible light region. The present inventors have conducted investigation to solve these problems, however, independent control of the in-plane retardation and the retardation in the thickness direction of a biaxial optical compensation films, thus improvement has been desired.

PRIOR ART DOCUMENTS

Patent Documents

| Patent Document 1 | Japanese Patent Application Publication Open to Public Inspection (hereafter referred to as JP-A) No. 10-312166 |
|---|---|
| Patent Document 2 | JP-A No. 10-186354 |
| Patent Document 3 | JP-A No. 11-133413 |
| Patent Document 4 | WO 2003/032060 |
| Patent Document 5 | JP-A No. 2000-131693 |
| Patent Document 6 | JP-A No. 2003-270442 |

SUMMARY OF THE INVENTION

Problems to be Solved by the Invention

Regarding the above mentioned problems, the present inventors have further studied to provide a different wavelength dispersion property individually to each of two biaxial optical films. For example, studied was to provide a reverse wavelength dispersion of a retardation value to a biaxial optical film provided on one side of a liquid crystal cell and to provide a flat or normal wavelength dispersion of a retardation value to a biaxial optical film provided on the other side of the liquid crystal cell. However, when two individually different wavelength dispersion properties are simply provided to the two biaxial optical films, the two biaxial optical films mutually cancel the wavelength dispersion property of the retardation value of each biaxial optical film. Thus, it has been difficult to fully improve the color shift or the viewing angle property caused by the incident light from an oblique direction.

In view of the foregoing problems, the present invention was achieved. An object of the present invention is to provide a VA mode liquid crystal display exhibiting excellent front contrast, and excellent properties regarding color shift and a viewing angle by suppressing the coloring in a black display due to light leakage.

Means to Solve the Problems

The above object of the present invention is achieved by the following structures.

As a first embodiment of the present invention, a vertical alignment mode liquid crystal display containing: a liquid crystal cell; a first polarizer and a second polarizer arranged so as to sandwich the liquid crystal cell; a first optical film arranged between the first polarizer and the liquid crystal cell; and a second optical film arranged between the liquid crystal cell and the second optical film, is cited.

Aforementioned first optical film and second optical film each are a resin film having an optically biaxial property, and the first optical film and the second optical film meet following Formulae (1) and (2), $$Ro_1 > Ro_2 \qquad \text{Formula (1)}$$

$$Rth_1 < Rth_2 \qquad \text{Formula (2)}$$

wherein $Ro_1$ and $Ro_2$ represent in-plane retardation values Ro (nm) of the first optical film and the second optical film, respectively, measured with light of a wavelength of 590 nm, $Ro_1$ and $Ro_2$ each being represented by Formula (I), $Rth_1$ and $Rth_2$ represent retardation values in the thickness direction Rth (nm) of the first optical film and the second optical film, respectively, measured with light of a wavelength of 590 nm, $Rth_1$ and $Rth_2$ each being represented by Formula (II), $$Ro=(nx-ny)\times d \qquad \text{Formula (I)}$$

$$Rth=\{(nx+ny)/2-nz\}\times d \qquad \text{Formula (II)}$$

wherein nx represents a refractive index in direction x in which the refractive index is largest in an optical film plane, ny represents a refractive index in a direction perpendicular to direction x in the optical film plane, and nz represents a refractive index in the thickness direction of the optical film and d (nm) represents a thickness of the optical film.

Further, the first optical film and the second optical film meet following Formulae (3) and (4).

$$DSP_{Ro1}<DSP_{Ro2} \qquad \text{Formula (3)}$$

$$DSP_{Rth1}<DSP_{Rth2} \qquad \text{Formula (4)}$$

wherein $DSP_{Ro1}$ and $DSP_{Ro2}$ represent wavelength dispersion properties of the in-plane retardation value Ro of the first optical film and the second optical film, respectively, $DSP_{Ro1}$ and $DSP_{Ro2}$ being expressed as $Ro_1(450)/Ro_1(630)$ and $Ro_2(450)/Ro_2(630)$, respectively, and $DSP_{Rth1}$ and $DSP_{Rth2}$ represent wavelength dispersion properties of the retardation value in the thickness direction Rth of the first optical film and the second optical film, respectively, $DSP_{Rth1}$ and $DSP_{Rth2}$ being expressed as $R_{th1}(450)/R_{th1}(630)$ and $R_{th2}(450)/R_{th2}(630)$, respectively.

Further, Ro(450) and Ro(630) represent retardation values Ro represented by Formula (I) at wavelengths of 450 nm and 630 nm, respectively, and Rth(450) and Rth(630) represent retardation values Rth represented by Formula (II) at wavelengths of 450 nm and 630 nm, respectively.

Effect of the Invention

According to the VA mode liquid crystal display of the present invention, it becomes possible to provide retardation necessary to compensate an apparent misalignment of the axes of the polarizers in a VA mode liquid crystal display and the retardation of the liquid crystal layer used in the liquid crystal cell without making the manufacturing process more complicated or increasing the thickness of the liquid crystal display by employing optically biaxial optical films each having an individual in-plane retardation and a retardation in the thickness direction.

Further, in an above aspect of the present invention, the in-plane retardation values (Ro values) and the retardation values in the thickness direction (Rth values) of a first optical film and a second optical film which are biaxial films are so constructed that the in-plane retardation value of the first optical film is larger than that of the second optical film, and the retardation value in the thickness direction of the second optical film is larger than that of the first optical film. Namely, the in-plane retardation value is disproportionately provided so that the retardation value of the first optical film is larger, and the retardation value in the thickness direction is disproportionately provided so that the retardation value of the second optical film is larger. Further, the wavelength dispersion of the in-plane retardation value of the first optical film is constructed to be smaller that the wavelength dispersion of that of the second optical film, and the wavelength dispersion of the retardation value in the thickness direction of the second optical film is constructed to be larger that the wavelength dispersion of that of the first optical film. Thus, in the liquid crystal display of the present invention, it is possible to control the in-plane retardation values and the retardation values in the thickness direction to have more preferable wavelength dispersion properties, because, when viewed as a whole, the first optical film is dominant with respect to the wavelength dispersion of the in-plane retardation value and the second optical film is dominant with respect to the wavelength dispersion of the retardation value in the thickness direction, since the in-plane retardation values and the retardation values in the thickness direction are individually disproportionately provided to the first optical film and the second optical film which are biaxial films, whereby the wavelength dispersion of the in-plane retardation value and the wavelength dispersion of the retardation value in the thickness direction are provided in different ways. Namely, wavelength dispersion properties suitable to compensate an apparent misalignment of the axes of the polarizers and the retardation value in the thickness direction of the liquid crystal cell in all over the visible light region can be provided.

As the results, the coloration which occurs in a black display due to light leakage can be suppressed and a VA mode liquid crystal display exhibiting excellent front contrast, and excellent properties regarding color shift and a viewing angle, when viewed from an oblique direction, can be provided. Further, by using two biaxial optical films which also have a function of a polarizing plate protective film, the manufacturing process can be made more simple without increasing the thickness of the liquid crystal display.

BRIEF DESCRIPTION OF THE DRAWING

FIG. 1 is a cross-sectional view of a liquid crystal display according to an aspect of an embodiment of the present invention viewed from a lateral side.

EMBODIMENTS TO CARRY OUT THE INVENTION

The embodiments of the present invention will be explained below with referring to a FIGURE, however, it is obvious that the present invention is not limited thereto.

FIG. 1 is a schematic cross-sectional view of a VA mode liquid crystal display used as the embodiment of the present invention viewed from a lateral side. The VA mode liquid crystal display shown in FIG. 1 a has liquid crystal cell 1 and a pair of polarizing plates 2a and 2b each arranged on the upper side and the lower side of the liquid crystal cell 1 while the transmission axes cross at right angles. The polarizing plate 2a is constituted of a polarizing plate protective film 4a, a first polarizer 3a and a first optical film 5, while the first optical film is arranged between the first polarizer 3a and the liquid crystal cell. The polarizing plate 2b is constituted of a polarizing plate protective film 4b, a second polarizer 3b and a second optical film 6, while the second optical film is arranged between the liquid crystal cell and the second polarizer 3b.

In the present invention, the first optical film and the second optical film each have an optically biaxial property, and the refractive index ellipsoid of each of the first optical film and the second optical film meet the condition of nx>ny>nz, where, nx represents the refractive index in the direction in which the refractive index in the optical film is the largest (x direction) in the plane of the optical film, ny represents the refractive index in the direction perpendicular to the x direction (y direction) in the plane of the optical film, and nz represents the refractive index in the thickness direction of the optical film.

As the first optical film and second optical film used in the present invention, an opically biaxial resin film is used. Therefore, it is possible to prepare the optical film by using a resin film which has been conventionally used as a polarizing plate protective by adjusting the retardation value, by which the manufacturing process can be made easier. Further, since it is possible to manufacture the film using a material exhibiting a smaller photoelastic coefficient compared with the case where a uniaxial optical compensation film is used, unevenness in retardation tends not occur.

In the present invention, it is also preferable that the first optical film and the second optical film each have a function of a polarizing plate protective film, whereby the optical compensation becomes possible, without increasing the thickness of a liquid crystal display.

The first optical film and second optical film which are used in the present invention meet the following Formulae (1) and (2).

$$Ro_1 > Ro_2 \quad (1)$$

$$Rth_1 < Rth_2 \quad (2)$$

(wherein $Ro_1$ and $Ro_2$ each represent an in-plane retardation Ro (nm) represented by following Formula (I) of the first optical film and the second optical film, respectively, measured using a light of a wavelength of 590 nm, $Rth_1$ and $Rth_2$ each represent a retardation Rth (nm) in the thickness direction of the first optical film and the second optical film, respectively, represented by following Formula (II) measured using a light of a wavelength of 590 nm.

$$Ro = (nx - ny) \times d \quad \text{Formula (I)}$$

$$Rth = \{(nx + ny)/2 - nz\} \times d \quad \text{Formula (II)}$$

wherein, nx represents the refractive index in the direction in which the refractive index in the optical film plane is the largest, ny represents the refractive index in the direction perpendicular to the x direction in the plane of the optical film, and nz represents the refractive index in the thickness direction of the optical film and d (nm) represents the thickness of the optical film).

Further, the wavelength dispersion of the first optical film and the second optical film meet following Formulae (3) and (4).

$$DSP_{Ro1} < DSP_{Ro2} \quad (3)$$

$$DSP_{Rth1} < DSP_{Rth2} \quad (4)$$

wherein $DSP_{Ro1}$ and $DSP_{Ro2}$ each represent a wavelength dispersion property of the retardation Ro in the planes of the first and the second optical films, respectively, each of which is expressed as $Ro_1(450)/Ro_1(630)$ and $Ro_2(450)/Ro_2(630)$, respectively, and $DSP_{Rth1}$ and $DSP_{Rth2}$ each represent a wavelength dispersion property of the retardation Rth in the thickness direction of the first and the second optical films, respectively, each of which is expressed as $R_{th1}(450)/R_{th1}(630)$ and $R_{th2}(450)/R_{th2}(630)$, respectively.

Also, Ro (450) and Ro (630) each represent a retardation Ro represented by above Formula (I) measured at wavelengths of 450 nm and 630 nm, respectively, and Also, Rth (450) and Rth (630) each represent a retardation Rth represented by above Formula (II) measured at wavelengths of 450 nm and 630 nm, respectively.

<<Measurements of Retardation Ro, Rth>>

A 35 mm×35 mm sample was cut from an optical film, and was subjected to conditioning at 25 C and 55% RH for 2 hours. Retardation value at a wavelength of 590 nm (450 nm and 630 nm for wavelength dispersion measurements) was calculated by extrapolation of retardation values measured at normal direction and inclined direction via automatic birefringence meter KOBURA-21ADH (produced by Oji Scientific Instruments Co., Ltd.).

As described above, by using in combination of a plurality of biaxial optical films to which the in-plane retardation values and the retardation values in the thickness direction are disproportionately provided, and the optical films having different wavelength dispersion properties of the in-plane retardation values and the retardation values in the thickness direction from each other, an apparent misalignment of the axes of the polarizers and the retardation value in the thickness direction of the liquid crystal cell can be compensated in all over the visible light region, whereby the coloration which occurs in a black display due to light leakage can be suppressed in all over the visible light region.

In the present invention, it is preferable that the first optical film is provided on the viewer side of the liquid crystal cell and the second optical film is provided on the backlight side of the liquid crystal cell, whereby it is possible to improve the front contrast of the liquid crystal display.

The first optical film used in the present invention preferably exhibits a reverse wavelength dispersion property of the in-plane retardation value $DSP_{Ro1}$ in the visible light region. Here, "a retardation value exhibits a reverse wavelength dispersion" means that the retardation value becomes smaller when the wavelength becomes shorter. Namely, in the present invention, preferable is the condition $DSP_{Ro1} < 1.0$ and more preferable is the condition $0.71 < DSP_{Ro1} < 0.90$. By providing a reverse wavelength dispersion property to the in-plane retardation of the first optical film, the misalignment of the axes of the polarizers can be compensated in a wide wavelength range.

The second optical film used in the present invention preferably exhibits a flat or normal wavelength dispersion property of the retardation value in the thickness direction $DSP_{Rth2}$, and more preferably exhibits a normal wavelength dispersion property of the retardation value in the visible light region. Here, "a retardation value exhibits a flat wavelength dispersion" means that the retardation value is almost constant independent of a wavelength, and "a retardation value exhibits a normal wavelength dispersion" means that the retardation value becomes larger when the wavelength becomes shorter. Namely, in the present invention, preferable is the condition $DSP_{Rth2} \geq 1.0$ and more preferable is the condition $1.06 \leq DSP_{Rth2} \leq 1.30$. By providing a flat or normal wavelength dispersion property to the retardation in the thickness direction of the second optical film, the retardation in the thickness direction of the liquid crystal layer can be compensated in a wide wavelength range.

The Rth value of the first optical film may be of normal wavelength dispersion or of reverse wavelength dispersion, or may exhibit no wavelength dependency, namely, of flat wavelength dispersion. However, when an optical film exhibiting a reverse wavelength dispersion of the Ro value is manufactured, its Rth value is generally of reverse wavelength dispersion. The Ro value of the second optical film may be of normal wavelength dispersion or of reverse wavelength dispersion, or may exhibit no wavelength dependency, namely, of flat wavelength dispersion. However, when an optical film exhibiting a normal wavelength dispersion of the Rth value is manufactured, its Ro value is generally of normal wavelength dispersion.

In the present invention it is preferable that the first optical film exhibits a reverse wavelength dispersion property of the in-plane retardation value $DSP_{Ro1}$, the second optical film exhibits a normal wavelength dispersion property of the retardation value in the thickness direction $DSP_{Rth2}$, and wavelength dispersion properties of the in-plane retardation value and the retardation value in the thickness direction of the first optical film and the second optical film meets following Formulae (5) and (6).

$$DSP_{Ro2} - DSP_{Ro1} > 0.1 \qquad \text{Formula (5)}$$

$$DSP_{Rth2} - DSP_{Rth1} > 0.1 \qquad \text{Formula (6)}$$

From the view points of the manufacturing process which contains no complicated process, and necessary retardation values for optical compensation, it is preferable that the in-plane retardation value and the retardation value in the thickness direction of the first optical film meet $40 \leq Ro_1 \leq 100$ and $70 \leq R_{th1} \leq 120$. Also, from the same view points as above cited for the first optical film, it is preferable that the in-plane retardation value and the retardation value in the thickness direction of the second optical film meet $10 \leq Ro_2 \leq 70$ and $100 \leq R_{th2} \leq 180$.

Further, it is preferable that the first optical film and the second optical film meet following Formulae (7) and (8).

$$Ro_1 - Ro_2 > 10 \qquad \text{Formula (7)}$$

$$Rth_2 - Rth_1 > 10 \qquad \text{Formula (8)}$$

It is more preferable that the first optical film and the second optical film meet following Formulae (9) and (10).

$$Ro_1 - Ro_2 > 20 \qquad \text{Formula (9)}$$

$$Rth_2 - Rth_1 > 20 \qquad \text{Formula (10)}$$

By being met with the aforementioned ranges and providing in-plane retardation values and retardation values in the thickness direction differently to the first optical film and the second optical film, the whole wavelength dispersion property can be controlled.

The light transmittance of the first optical film and the light transmittance of the second optical film are preferably different. More preferably, the light transmittance of the first optical film is smaller than the light transmittance of the second optical film. By using films having thus different light transmittances in combination, the front contrast can be improved.

The first optical film and the second optical film used in the liquid crystal display of the present invention will be detailed below.

[First Optical Film]

The first optical film used in the present invention is a resin film having an optically biaxial property, and the in-plane retardation values (Ro values) and the retardation values in the thickness direction (Rth values) of the first optical film and the second optical film are so arranged that the in-plane retardation value of the first optical film is larger than the in-plane retardation value of the second optical film, and that the retardation value in the thickness direction of the second optical film is larger than the retardation value in the thickness direction of the first optical film.

Further, the wavelength dispersion of the in-plane retardation value of the first optical film is arranged to be smaller than the wavelength dispersion of the in-plane retardation value of the second optical film, and the wavelength dispersion of the retardation value in the thickness direction of the second optical film is arranged to be larger than the wavelength dispersion of the retardation value in the thickness direction of the first optical film.

The method of manufacturing the first optical film is not specifically limited as far as the aforementioned relationships are satisfied, however, the examples of materials and the examples of the manufacturing method of the first optical film will be described in detail below.

(Materials of First Optical Film)

The materials used in the first optical film employed in the present invention is not specifically limited as far as the aforementioned relationships are satisfied, however, a cellulose ester film containing a cellulose ester as a main component may be preferably used. Since the cellulose ester film has been widely used as a polarizing plate protective film, and the cellulose ester film exhibits an excellent adhering property with a polyvinyl alcohol film impregnated with iodine, which is commonly used as a polarizer, there is no need to further provide a protect film to enhance the adhering property, whereby increase in thickness of a polarizing plate can be avoided.

The cellulose ester to be used is not specifically limited; however, cellulose ester may be a carboxylic acid ester having a carbon number of approximately 2 to 22, and the carboxylic acid ester may be an ester of aromatic carboxylic acid. Specifically preferably is a lower fatty acid ester oc cellulose having a carbon number of 6 or less (hereafter, also referred to as a cellulose acylate).

An acyl group bonding to a hydroxyl group of cellulose may be a straight chain or a branched chain, or may form a ring. Further, the acyl group may be substituted with other substituent. In the case of the same substitution degree, it is preferable to select an acyl group from those having a carbon number of 2 to 6. The carbon number of the aforesaid cellulose ester is preferably 2 to 4 and more preferably 2 to 3.

As the cellulose ester, utilized can be mixed fatty acid esters of cellulose, in which a propionate group or a butyrate group is bonded in addition to an acetyl group, such as a cellulose acetate, a cellulose acetate propionate, a cellulose acetate butyrate or a cellulose acetate propionate butyrate.

Herein, as a butyryl group to form butyrate may be either a straight chain form or branched chain. As cellulose ester preferably used in the present invention, a cellulose acetate, a cellulose acetate propionate, a cellulose acetate butyrate, and cellulose acetate phthalate are specifically preferably utilized.

As a cellulose ester preferable in the present invention other than a cellulose acetate phthalate, preferable is a cellulose ester which meets following Formulas (i) and (ii) simultaneously.

$$2.0 \leq X + Y \leq 3.0 \qquad \text{Formula (1)}$$

$$0 \leq Y \leq 1.5 \qquad \text{Formula (2)}$$

In the formulas, X is a substitution degree of an acetyl group, Y is a substitution degree of a propionyl group or a butylyl group or a mixture thereof A resin having a different substitution degree may be mixed to obtain a desired optical property. As a mixing ratio, 10:90-90:10 (in mass ratio) is preferred.

Of these, cellulose acetate propionate is preferably employed. A cellulose acetate propionate which meets $1.0 \leq X \leq 2.5$, $0.1 \leq Y \div 1.5$, and $2.0 \leq X + Y \leq 3.0$ is preferably used. The acyl substitution degree of the cellulose ester can be measured according to ASTM-D817-96.

The number average molecular weight of the cellulose ester is preferably 60,000 to 300,000 to obtain film having good mechanical strength and those of 70,000 to 200,000 are used more preferably.

The weight average molecular weight Mw and the number average molecular weight Mn of the cellulose ester can be measured by using gel-permeation chromatography (GPC).

One of the examples of the measuring condition will be described below, however, the method is not limited thereto, and a similar measuring method may be employed.
Solvent: Methylene chrolide
Column: Shodex K806, K805, K803G (produced by Showa Denko K. K., these three columns are connected to use)
Column temperature: 25° C.
Sample concentration: 0.1 mass %
Detector: RI Model 504 (produced by GL Sciences Inc.)
Pump: L6000 (produced by Hitachi Ltd.)
Flow rate: 1.0 ml/minute
Calibration curve: Standard polystyreneSTK standard polystyrene (produced by Tosoh Corp.) A calibration curve obtained from 13 samples in the range of Mw=1000000–50 is used. The 13 samples are used in almost equal intervals.

Cellulose as raw material for a cellulose ester used in the present invention is not particularly limited, and usable are, for example, cotton linter, wood pulp and kenaf. Cellulose esters made from these raw materials may be arbitrarily mixed to use.

The cellulose ester used in the present invention, for example, cellulose-acetate-propionate may be manufactured according to a method known in the art. Specifically, synthesis can be performed according to a method described in JP-A No. 10-45804.

When using a cellulose ester film for the first optical film, a cellulose ester film obtained via a film forming method by casting itself generally has a negative uniaxial nature (nx=ny>nz) or a weak biaxial nature (nx>ny>nz). Also, a cellulose ester film generally has a positive inherent birefringence (namely, the refractive index of the stretched direction becomes larger). Accordingly, an optical film having an optically biaxial property (nx>ny>nz) can be obtained by uniaxially stretching in the film casting direction (the MD direction) or in the direction perpendicular to the film casting direction (the TD direction) or by biaxially stretching, sequentially or simultaneously, while the stretching ratios in the biaxial directions are mede different from each other. Therefore, the Ro value which is an in-plane retardation value can be adjusted by controlling the stretching ratio of uniaxial stretching or the difference in the stretching ratios in the biaxial directions. Alternatively, the Rth value which is a retardation value in the thickness direction of a cellulose ester film becomes larger by stretching in an in-plane direction. Thus, the Ro value and the Rth value can be appropriately adjusted by stretching. Here, in the case of uniaxial stretching, the increasing rates of the Ro value and the Rth value depend on the cellulose ester used in the cellulose ester film. It is also possible to suppress the increase in the Rth value compared to the increase in the Ro value by biaxial stretching. For example, when a film is stretched in the same stretching ratio in biaxis directions, only the Rth value can be increased without increasing the Ro value. The method of stretching will be described later.

As other method to adjust the retardation value of a cellulose ester film, the following methods may be cited.

When a cellulose ester film is manufactured via a solution casting method, the occurrence of retardation (namely, the retardation values in an in-plane direction and in a thickness direction) becomes larger when the residual amount of the solvent in the stretching process is smaller. Accordingly, it is also possible to adjust the occurrence of retardation by controlling the drying condition of the cellulose ester film before stretching.

When a cellulose ester film is manufactured via a solution casting method, the retardation value in the thickness direction tends to become larger, since the i-plane orientation is enhanced by drying of the solvent. Accordingly, when a cellulose ester film is formed via a melt casting method, the occurrence of an Rth value via casting may be suppressed to a certain extent.

In general, the occurrence of retardation in a cellulose ester film via stretching tends to become larger when the total acyl substitution degree is smaller. Accordingly, it is also possible to adjust the occurrence of retardation by controlling the total acyl substitution degree of the cellulose ester.

It is necessary that the first optical film used in the present invention exhibits a larger in-plane retardation value Ro than that of the second optical film and a smaller retardation value in the thickness direction Rth than that of the second optical film.

As a method to make the in-plane retardation value Ro of the first optical film ($Ro_1$) larger than the in-plane retardation value Ro of the second optical film ($Ro_2$), a method to control the stretching ratio as described above may be cited. However, as mentioned above, in a cellulose ester film, when Ro value is made to increase only by a stretching treatment, the Rth value would also increase and the Rth value of the first optical film ($Rth_1$) may become larger than the Rth value of the second optical film ($Rth_2$).

Therefore, in order to increase the in-plane retardation value $Ro_1$ preferentially to the retardation value in the thickness direction $Rth_1$ in the first optical film, a retardation increasing agent (also referred to as a retardation adjusting agent) may be incorporated in the first optical film. Since the effect of a retardation increasing agent is different depending on the kind of the resin as a mother substance, it happens that a compound which works as a retardation increasing agent in a certain resin exhibits no effect as a retardation increasing agent in another resin. In the present invention, such a compound which increases the retardation value of a resin of a mother substance, when the compound is added to the mother substance, to a retardation value higher than the retardation value of the mother substance before it is added with the compound are generically defined as a retardation increasing agent. The retardation increasing agent is not specifically limited, however, cited are rod-shaped compounds disclosed in paragraphs [0022]-[0024] of JP-A No. 2000-342226.

As described above, an in-plane retardation value can be adjusted by a stretching treatment etc. However, since there is a limitation in the stretching ratio which is possible in the manufacturing process, there also is a limitation in the retardation value obtainable only by the stretching treatment. Accordingly, aforementioned retardation increasing agent may also be used to cover the insufficient amount of the retardation value. Specifically, the retardation value of a cellulose film obtained by stretching generally has a tendency to become larger when the total substitution degree of a cellulose ester becomes lower, as described above. Therefore, when a cellulose ester film having a high total substitution degree is used for the first optical film, it is preferable to incorporate a retardation increasing agent which increases the in-plane retardation value in the first optical film.

Also, it is necessary that the wavelength dispersion of the in-plane retardation value of the first optical film used in the present invention ($DSP_{Ro1}$) is smaller than the wavelength dispersion of the in-plane retardation value of the second optical film ($DSP_{Ro2}$).

It is preferable that the wavelength dispersion property of the first optical film $DSP_{Ro1}$ is a reverse wavelength dispersion property, namely, $DSP_{Ro1}<1.0$. Accordingly, as a method by which the wavelength dispersion properties of the in-plane retardation value of the first optical film and the second optical film meet the above-mentioned relationship, it is preferable to make $DSP_{Ro1}$ of the first optical film to have a stronger reverse wavelength dispersion property than $DSP_{Ro2}$ of the second optical film.

Generally, the wavelength dispersion property of the in-plane retardation value caused by a stretching treatment of a cellulose ester film is a reverse wavelength dispersion property. Specifically, in the case of a cellulose triacetate film, there is a tendency that the reverse wavelength dispersion property of a retardation value is stronger than that of a cellulose-acetate-propionate film.

On the other hand, when a retardation increasing agent as described above is used in a cellulose ester film and the film is stretched, the in-plane retardation value caused by the contribution of the retardation increasing agent has a tendency to show a flat wavelength dispersion property or a normal wavelength dispersion property.

Therefore, the wavelength dispersion property of the retardation value of a cellulose ester film is determined by the summation of the reverse wavelength dispersion property caused by the stretching of the cellulose ester film, and the flat or normal wavelength dispersion property caused by the contribution of the retardation increasing agent. Therefore, it is possible to strengthen the reverse wavelength dispersion property by increasing the ratio of the retardation caused by the stretching of a cellulose ester film. On the contrary, it is possible to weaken the reverse wavelength dispersion property or to adjust the wavelength dispersion property to exhibit a flat or normal wavelength dispersion property by increasing the addition amount of a retardation increasing agent to increase the ratio of the retardation caused by the contribution of the retardation increasing agent.

However, there may be a case that, in order to attain a larger in-plane retardation value, it is necessary to increase the addition amount of a retardation increasing agent, whereby the reverse wavelength dispersion property is weakened, although a stronger reverse wavelength dispersion property is desired. In such a case, a wavelength dispersion regulator may be contained. The reverse wavelength dispersion property of a retardation value can be strengthened by incorporating a wavelength dispersion regulator. Further, the reverse wavelength dispersion property of a retardation value can be adjusted by controlling the content of a wavelength dispersion regulator. The wavelength dispersion regulator is not specifically limited, however, for example, compounds disclosed in paragraphs [0022]-[0033] in JP-A No. 2008-273925 may be cited as examples.

Namely, as a method to make the wavelength dispersion property of the in-plane retardation value of the first optical film smaller than the wavelength dispersion property of the retardation of the second optical film, cited are methods of, for example, a method to make the ratio of the retardation value caused by stretching the film of the first optical film larger than that of the second optical film, a method to increase the adding amount of a wavelength dispersion regulator, and a combination thereof.

The first optical film used in the present invention may further contain an additive listed below.

(Prasticizers)

The first optical film can be incorporated with a plasticizer. A plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acrylic type plasticizer. When two types or more among them are utilized, at least one type is preferably a polyhydric alcohol ester type plasticizer.

A polyhydric alcohol ester type plasticizer is a plasticizer comprising ester of fatty acid polyhydric alcohol of not less than divalent and monocarboxylic acid, and is preferably provided with an aromatic ring or a cycloalkyl ring in a molecule. It is preferably fatty acid polyhydric alcohol ester of 2 to 20 valent.

Polyhydric alcohol preferably utilized in the present invention is represented by following formula (a).

$$R1\text{-}(OH)n \hspace{2cm} \text{Formula (a)}$$

wherein, R1 is a n-valent organic group, n is a positive integer of not less than 2 and OH is an alcoholic and/or phenolic hydroxyl group.

Examples of preferable polyhydric alcohol include such as the following; however, the present invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methyl-pentane-1,3,5-triol, pinacol, sorbitol, trimethylolpropane, trimethylolethane and xylitol. Specifically preferable are triethylene glycol, tetraethylene glycol, dipropylene glycol, tripropylene glycol, sorbitol, trimethylolpropane and xylitol.

Monocarboxylic acid utilized in polyhydric alcohol ester is not specifically limited and such as conventionally known fatty acid monocarboxylic acid, alicyclic monocarboxylic acid and aromatic monocarboxylic acid can be utilized. It is preferable to utilize alicyclic monocarboxylic acid or aromatic monocarboxylic acid with respect to improvement of moisture permeability and reservation property.

Examples of preferable monocarboxylic acid include the followings; however, the present invention is not limited thereto.

As fatty acid monocarboxylic acid, fatty acid having a straight chain or a branched chain of carbon number of 1 to 32 can be preferably utilized. The carbon number is more preferably 1 to 20 and specifically preferably 1 to 10. It is preferable to incorporate acetic acid because of increasing compatibility with cellulose ester, and it is also preferable to utilize acetic acid and other monocarboxylic acid by mixing.

Preferable monocarboxylic acid includes saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid or derivatives thereof.

Examples of preferable aromatic monocarboxylic acid include those in which 1 to 3 of alkoxy groups such as an alkyl group, a methoxy group or an ethoxy group are introduced into a benzene ring of such as benzoic acid and toluic acid, aromatic carboxylic acid having at least two benzene ring such as biphenyl carboxylic acid, naphthalene carboxylic acid and tetralin carboxylic acid, or derivatives thereof. Benzoic acid is specifically preferable.

A molecular weight of polyhydric alcohol ester is not specifically limited, however, is preferably 300 to 1,500 and more preferably 350 to 750. The molecular weight is preferably the larger because of being hard to evaporate, while the smaller is preferable with respect to moisture permeability and compatibility with cellulose ester.

Carboxylic acid utilized in polyhydric alcohol may be either one type or a mixture of two or more types. Further, OH groups in polyhydric alcohol may be all esterified or may partly remain as an OH group.

A glycolate type plasticizer is not specifically limited, however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic acid ester type plasticizer includes such as diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citric acid ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl sebacate.

A phosphoric acid ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic acid ester compound is comprised of ester of polycarboxylic acid of not less than 2 valent, preferably of 2 to 20 valent, and alcohol. Further, aliphatic polycarboxylic acid is preferably of 2 to 20 valent. In the case of aromatic polycarboxylic acid and alicyclic polycarboxylic acid, 3 to 20 valent are preferable.

Polycarboxylic acid is represented by following Formula (b).

$$R_2(COOH)_m(OH)_n \quad \text{Formula (b)}$$

(wherein, $R_2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the followings, however, the present invention is not limited thereto. Aromatic polycarboxylic acid of not less than 3 valent such as trimellitic acid, trimesic acid and pyromellitic acid, and derivatives thereof; aliphatic polycarboxylic acid such as succinic acid, adipic acid, azelaic acid, sebacic acid, oxalic acid, fumaric acid, maleic acid and tetrahydrophthalic acid; oxypolycarboxylic acid such as tartaric acid, tartronic acid, malic acid and citric acid; can be preferably utilized. It is specifically preferable to utilize oxypolycarboxylic acid with respect to such as improvement of storage stability.

Alcohol utilized in a polycarboxylic ester compound, which can be utilized in the present invention, is not specifically limited and conventionally known alcohols and phenols can be utilized. For example, straight chain or branched aliphatic saturated alcohol or aliphatic unsaturated alcohol, having a carbon number of 1 to 32, can be preferably utilized. The carbon number is more preferably 1 to 20 and specifically preferably 1 to 10. Further, such as alicyclic alcohol such as cyclopentanol and cyclohexanol or derivatives thereof, and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, the present invention is not limited thereto.

As aliphatic monocarboxylic acid, straight chain or branched fatty acid having a carbon number of 1 to 32 is preferably utilized. The carbon number is more preferably 1 to 20 and specifically preferably 1 to 10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthalene carboxylic acid and tetralin carboxylic acid, or derivatives thereof. Acetic acid, propionic acid and benzoic acid are specifically preferable.

The molecular weight of a monocarboxylic ester compound is not specifically limited, however, is preferably in a range of 300 to 1,000 and more preferably in a range of 350 to 750. The molecular weight is preferably the larger with respect to storage stability, while it is preferably smaller with respect to moisture permeability and compatibility with cellulose ester.

Alcohols, which are utilized in polycarboxylic ester applicable in the present invention, may be either one type or a mixture of at least two types.

An acid value of a polycarboxylic ester compound utilizable in the present invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured according to JIS K0070.

Specifically preferable examples of a polycarboxylic ester compound will be shown below, however, the present invention is not limited thereto. For example, listed are triethyl citrate, tributyl citrate, acetyltriethyl citrate (AEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plasticizer is not specifically limited, however, a polyester type plasticizer having an aromatic ring or a cycloalkyl ring in a molecule can be utilized. A polyester type plasticizer is not specifically limited, however, such as an aromatic terminal ester type plasticizer represented by following Formula (c) can be utilized.

$$B\text{-}(G\text{-}A)_n\text{-}G\text{-}B \qquad \text{Formula (c)}$$

(wherein, B is a benzene monocarboxylic acid residual group; G is an alkylene glycol residual group having a carbon number of 2 to 12, an aryl glycol residual group having a carbon number of 6 to 12, or an oxyalkylene glycol residual group having a carbon number of 4 to 12; A is an alkylene dicarboxylic acid residual group having a carbon number of 4 to 12 or an aryl dicarboxylic acid residual group having a carbon number of 6 to 12; and n is an integer of not less than 1.)

A compound represented by Formula (c) is comprised of benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester type plasticizer.

A benzene monocarboxylic acid component of polyester type plasticizer utilized in the present invention includes such as benzoic acid, p-tertiary-butylbenzoic acid, ortho-toluic acid, metha-toluic acid, para-toluic acid, dimethylbenzoie acid, ethylbenzoic acid, n-propylbenzoic acid, aminobenzoic acid and acetoxybenzoic acid, and these each may be utilised alone or as a mixture of not less than two types.

An alkylene glycol component having a carbon number of 2 to 12, which can be utilized in the present invention, includes such as ethylene glycol, 1,2-propylene glycol, 1,3-propylene glycol, 1,2-butanediol, 1,3-butanediol, 1,2-propanediol, 2-methyl-1,3 propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-mthyl-1,8-octanediol, 1,9-nonanediol, 1,10-decanediol and 1,12-octadecanediol; and these glycols are utilized alone or as a mixture of at least two types. An alkylene glycol having a carbon number of 2 to 12 is specifically preferable because of excellent compatibility with cellulose ester.

Further, an oxyalkylene glycol component, having a carbon number of 4 to 12, of the above-described aromatic terminal ester includes such as diethylene glycol, diethylene glycol, tetraethylene glycol, dipropylene glycol and tripropylene glycol; and these glycols can be utilized alone or as a mixture of two or more types.

An alkylene dicarboxylic acid component, having a carbon number of 4 to 12, of aromatic terminal ester includes such as maleic acid, fumaric acid, glutaric acid, adipic acid, azelaie acid, sebacic acid and dodecane dicarboxylic acid; and these may be utilized alone or as a mixture of not less than two types. An arylene dicarboxylic acid component having a carbon number of 6 to 12 is phthalic acid, terephthalic acid, isophthalie acid, 1,5-naphthalene dicarboxylic acid and 1,4-naphthalene dicarboxylic acid.

A polyester type plasticizer utilized in the present invention preferably has a number average molecular weight in a range of 300 to 1,500 and more preferably of 400 to 1,000.

Further, an acid value thereof is not more than 0.5 mg KOH/g and a hydroxyl group value of not more than 25 mg KOH/g; and more preferably the acid value is not more than 0.3 mg KOH/g and the hydroxyl group value of not more than 15 mg KOH/g.

In the following, synthesis examples of an aromatic terminal ester type plasticizer utilizable in the present invention will be shown.

<Sample No. 1 (Aromatic Terminal Ester Sample)>

Phthalic acid of 410 parts, 610 parts of benzoic acid, 737 parts of dipropylene glycol and 0.40 parts of tetraisopropyl titanate as a catalyst were charged together in a reaction vessel which was attached with a reflux condenser, and the system was kept heated at 130 to 250° C. to continuously remove the generated water while excess monohydric alcohol was refluxed with stirring in nitrogen gas flow. Next, the distillate was removed at 200 to 230° C. under a reduced pressure of not higher than $1.33 \times 10^4$ Pa and finally of not higher than $4 \times 10^2$ Pa, followed by being filtered to prepare an aromatic terminal ester type plasticizer having the following characteristics.

Viscosity (25° C., mPa·s); 43,400

Acid value; 0.2

<Sample No. 2 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 341 parts of ethylene glycol and 0.35 parts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.

Viscosity (25° C., mPa·s); 38,000

<Sample No. 4 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.

Viscosity (25° C., mPa·s); 37,000

Acid value; 0.05

(Acrylic Polymers)

The first optical film used in the present invention may contain a (meth)acrylic polymer as a plasticizer.

The aforementioned (meth)acrylic polymer is preferably a polymer Y having a molecular weight of 500 or more but 3000 or less, which is obtained by polymerizing an ethylenicslly unsaturated monomer Ya having no aromatic ring.

The (meth)acrylic polymer is more preferably a polymer Y having a molecular weight of 500 or more but 3000 or less, which is obtained by a process of copolymerizing an ethylenically unsaturated monomer Xa having no aromatic ring and no hydroxyl group in the molecule thereof and an ethylenically unsaturated monomer Xb having no aromatic ring but having a hydroxyl group in the molecule thereof.

It is a further preferable embodiment that the above polymer X is represented by Formula (X) and the above polymer Y is represented by Formula (Y).

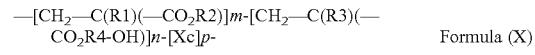

(in these formulas, R1, R3, and R5 each represent H or $CH_3$, R2 is an alkyl group or a cycloalkyl group having a carbon number of 1 to 12, R4 and R6 represent —$CH_2$—, —$C_2H_4$—, or —$C_3H_6$—, Ry represents OH, H, or an alkyl group having a carbon number of 3 or less, Xc represents a monomer unit polymerizable with Xa and Xb, Yb represents a monomer unit copolymerizable with Ya, and m, n, k, p and q each represent a mole composition ratio, provided that each of m and k is not 0, m+n+p=100, and k+q=100.

<Compounds Having Furanose Structure or Pyranose Structure>

The first optical film of the present invention may contain a compound having a furanose structure or a pyranose structure as a plasticizer.

As a compound having a furanose structure or a pyranose structure, preferable is an esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified. The esterified compound of (A) and the esterified compound of (B) are called a sugar ester compound in the present invention.

Further, the above mentioned esterified compound is preferably benzoate of monosaccharide (α-glucose, β-fructose) or benzoate of polysaccharide prepared by dehydration condensation of arbitrary two of —$OR_{12}$, —$OR_{15}$, —$OR_{22}$ and —$OR_{25}$ in monosaccharide represented by the aforesaid Formula (A), in which m+n=2 to 12.

The benzoyl group may further have a substituent which includes such as an alkyl group, an alkenyl group, an alkoxy group and a phenyl group, and the alkyl, alkenyl and phenyl group may further have a substituent.

Preferable examples of the Compound (A) and Compound (B) include the following; however, the present invention is not limited thereto.

Examples of the Compound (A) are listed as glucose, galactose, mannose, fructose, xylose and arabinose.

Examples of the Compound (B) are listed as lactose, sucrose, nistose, 1F-fructosyl nistose, stachyose, maltitol, lactitol, lactulose, cellobiose, maltose, cellotriose, maltotriose, raffinose or kestose. In addition to these, listed are such as gentiobiose, gentiotriose, gentiotetraose, xylotriose and galactosylscurose. Among these the Compound (A) and Compound (B), compounds having the both of a pyranose. Such as sucrose, kestose, nistose, 1F-fructosyl nistose and stachyose are preferable, and sucrose is more preferable. The compound bonding 2 or 3 of at least one type of furanose structure and pyranose structure in Compound (B) is one of preferable embodiments.

Monocarboxylic acid utilized for esterification of a part of or all of OH groups in the Compound (A) and Compound (B) according to the present invention is not specifically limited, and conventional compound such as aliphatic monocarboxylic acid, alicyclic monocarboxylic acid and aromatic monocarboxylic acid can be utilized. Carboxylic acid utilized may be one type or a mixture of not less than two types.

Preferable aliphatic monocarboxylic acid includes saturated fatty acid such as acetic acid, propionic acid, butyric acid, isobutyric acid, valeric acid, caproic acid, enanthic aid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montane acid, melissic acid and lacceric acid; and unsaturated fatty acid such as undecylenic acid, oleic acid, sorbic acid, linoleic acid, linolenic acid, arachidonic acid and octenoic acid.

Examples of preferable alicyclic monocarboxylic acid include cyclopentanecarboxylic acid, cyclohexanecarboxylic acid, cyclooctanecarboxylic acid or derivatives thereof.

Examples of aromatic monocarboxylic acid include aromatic monocarboxylic acid in which an alkyl group or an alkoxy group is introduced to a benzene ring of such as benzoic acid and toluic acid; aromatic monocarboxylic acid having at least two benzene rings such as benzilic acid, biphenyl carboxylic acid, naphthalene carboxylic acid, tetralin carboxylic acid or derivatives thereof, and more specifically, include xylylic acid, hemellitic acid, mesitylenic acid, prehnitylic acid, γ-isodurylic acid, durylic acid, mesitonic acid, α-isodurylic acid, cuminic acid, α-toluic acid, hydroatropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asarylic acid, mandelic acid, homoanisic acid, homovanillic acid, homoveratric acid, o-homoveratric acid, phthalonic acid and p-cournaric acid; specifically preferable is benzoic acid.

Among the esterified compounds of Compound (A) and Compound (B) is preferably an acetylated compound in which acetyl group is introduced by esterification.

A manufacturing method of the acetylated compound is described in, for example, JP-A No. 8-245678.

In addition to the esterified compounds of Compound (A) and Compound (B), an ester compound of oligosaccharide can be applied as a compound having 3 to 12 of at least one type of a pyranose structure or a furanose structure according to the present invention.

Oligosaccharide is manufactured by acting an enzyme such as amylase on such as starch and saccharose, and oligosaccharide applicable in the present invention includes such as maltooligosaccharide, isomaltooligosaccharide, furactooligosaccharide, galactooligosaccharide and xylooligosaccharide.

Oligosaccharide can be acetylated by the similar method to those of Compound (A) and Compound (B).

An example of manufacturing method of the esterified compound.

Acetic anhydride (200 ml) was dripped to a solution of glucose (29.8 g, 166 mmol) in 100 ml of pyridine, and reaction was conducted for 24 hours. Solution was condensed by evaporation, and poured into iced water. After standing for one hour, solid was separated from water by a glass filter. Solid on the glass filter was dissolved with chloroform, and was separated by cold water until neutralization. Organic phase was separated and dried with anhydrous sodium sulfate. After removing anhydrous sodium sulfate by filtration, chloroform was removed by evaporator, and glucose pentaacetate (58.8 g, 150 mmol, yield of 90.9%) was thus obtained. Monocarboxylic acid described above can be used instead of the above mentioned acetic anhydride.

Optical film of the present invention preferably contains 1 to 30 mass % of esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified, and specifically preferably contains 5 to 30 mass %, for the purpose of inhibiting variation of phase difference to stabilize display quality. It is preferable that an excellent effect of the present invention is exhibited as well as no bleed out is generated in the case of this range.

A (meth)acrylic polymer and all or a part of OH groups in Compound (A) having one furanose structure or pyranose structure or Compound (B) bonding 2 to 12 of at least one type of furanose structures or pyranose structures may be used in combination with other plasticizer.

[Second Optical Film]

As aforementioned, the second optical film used in the present invention is a resin film having an optically biaxial property, and the in-plane retardation values (Ro values) and the retardation values in the thickness direction (Rth values) of the first optical film and the second optical film are so arranged that the in-plane retardation value of the first optical film is larger than the in-plane retardation value of the second optical film, and that the retardation value in the thickness direction of the second optical film is larger than the retardation value in the thickness direction of the first optical film.

Further, the wavelength dispersion of the in-plane retardation value of the first optical film is arranged to be smaller than the wavelength dispersion of the in-plane retardation value of the second optical film, and the wavelength dispersion of the retardation value in the thickness direction of the second optical film is arranged to be larger than the wavelength dispersion of the retardation value in the thickness direction of the first optical film.

The method of manufacturing the second optical film is not specifically limited as far as the aforementioned relationships are satisfied, however, the examples of materials and the examples of the manufacturing method of the second optical film will be described in detail below.

(Materials of Second Optical Film)

The materials used in the second optical film employed in the present invention is not specifically limited as far as the aforementioned relationships are satisfied, however, a cellulose ester film containing a cellulose ester as a main component may be preferably used according to the same reason as described for the first optical film.

When using a cellulose ester film for the second optical film, the in-plane retardation value of the second optical film $Ro_2$ and the retardation value in the thickness direction $Rth_2$ of the second optical film can be adjusted in the same manner as the methods described for the first optical film (namely, by stretching or by using a retardation increasing agent).

It is necessary that the second optical film used in the present invention exhibits a smaller in-plane retardation value Ro than that of the first optical film and a larger retardation value in the thickness direction Rth than that of the first optical film.

As a method to make the retardation value in the thickness direction Rth of the second optical film ($Rth_2$) larger than the retardation value in the thickness direction Rth of the first optical film ($Rth_1$), for example, a method to control the stretching ratio may be cited. A cellulose ester film has a nature that, when a cellulose ester film is stretched in a casting direction or in a direction perpendicular to the casting direction, not only the Ro value but also the Rth value is increased. Accordingly, the Rth value can be increased by increasing the stretching ratio in the uniaxial direction or in the biaxial directions. However, when the stretching ratio is simply increased, not only the Rth value but also the Ro value is increased, whereby the in-plane retardation value (Ro) of the second optical film ($Ro_2$) may become larger that the in-plane retardation value (Ro) of the first optical film ($Ro_1$).

Therefore, as the method to increase the retardation value in the thickness direction of the second optical film $Rth_2$ preferentially to the in-plane retardation value $Ro_2$, the following method may be cited. At first, cited is a method to conduct stretching in the biaxial directions, namely, in the casting direction and in the direction perpendicular to the casting direction, while the difference between the stretching ratio in the casting direction and the stretching ratio in the direction perpendicular to the casting direction is made small. When the difference in the stretching ratios in the biaxial directions is made small, the Rth value can be increased while suppressing the increase in the Ro value.

Also, as the method to increase the retardation value in the thickness direction of the second optical film $Rth_2$ preferentially to the in-plane retardation value $Ro_2$, it is preferable to incorporate a retardation increasing agent which increases the retardation value in the thickness direction in the second optical film. Such a retardation increasing agent is not specifically limited, however, for example, $Ro_2$ can be preferentially increased compared to $Rth_2$ by orienting a compound having a disk-like molecular structure. As the method to orient such a disk-like compound, cited may be a method to stretch the film for orienting, or a method to use a compound having a nature to be oriented in a direction parallel to the film. Examples of such a disk-like compound include those disclosed in paragraphs [0014]-[0107] of JP-A No. 2001-166144. The retardation value in the thickness direction can be adjusted by controlling the content of the retardation increasing agent. Thus, the retardation value in the thickness direction of the second optical film $Rth_2$ can be made larger than the retardation value in the thickness direction of the first optical film $Rth_1$.

As described above, the retardation value in the thickness direction can be adjusted by a stretching treatment etc. However, since there is a limitation in the stretching ratio which is possible in the manufacturing process, there also is a limitation in the retardation value obtainable only by the stretching treatment. Accordingly, aforementioned retardation increasing agent may also be used to cover the insufficient amount of the retardation value.

Also, it is necessary that the wavelength dispersion of the retardation value in the thickness direction of the second optical film used in the present invention ($DSP_{Rth2}$) is larger than the wavelength dispersion of the retardation value in the thickness direction of the first optical film used in the present invention ($DSP_{Rth1}$).

It is preferable that the wavelength dispersion property of the second optical film $DSP_{Rth2}$ is a flat or normal wavelength dispersion property, namely, $DSP_{Rth2} \geq 1.0$. Accordingly, as a method by which the wavelength dispersion properties of the retardation value in the thickness direction of the first optical film and the second optical film meet the above-mentioned relationship, it is preferable to make $DSP_{Rth2}$ of the second optical film to have a stronger normal wavelength dispersion property than $DSP_{Rth1}$ of the first optical film. It is specifically preferable to make $DSP_{Rth1}$ of the first optical film of a reverse wavelength dispersion property and to make $DSP_{Rth2}$ of the second optical film of a strong normal wavelength dispersion property.

Generally, the wavelength dispersion property of the retardation value in the thickness direction caused by a stretching treatment of a cellulose ester film is a reverse wavelength dispersion property as the same as the in-plane retardation value. For example, in the case of a cellulose triacetate film, there is a tendency that the reverse wavelength dispersion property of a retardation value is stronger than that of a cellulose-acetate-propionate film.

On the other hand, the retardation value caused by incorporating a retardation increasing agent as described above (a disk-like compound) in a cellulose ester film to orient in an in-plane direction, namely, the retardation value in the thickness direction, has a tendency to show a flat wavelength dispersion property or a normal wavelength dispersion property.

Therefore, the wavelength dispersion property of the retardation value of a cellulose ester film is determined by the summation of the reverse wavelength dispersion property caused by the stretching of the cellulose ester film, and the flat or normal wavelength dispersion property caused by the contribution of the retardation increasing agent.

Therefore, it is possible to weaken the reverse wavelength dispersion property or to adjust to exhibit a flat or normal wavelength dispersion property by increasing the addition amount of the retardation increasing agent in the second optical film to change the ratio of the retardation caused by the contribution of the retardation increasing agent. Such a contribution becomes different depending on the kind of the retardation increasing agent or the plasticizer, and it is controllable by appropriately selecting these agents. It is one of the preferable embodiments of the present invention to provide a retardation value in the thickness direction to the second optical film by using a cellulose acetate-propionate film as the second optical film and by incorporating a retardation increasing agent (a disk-like compound) to orient in a direction parallel to the film, as a method to provide a retardation value in the thickness direction to the second optical film.

The second optical film may further contain other additive as the same as the first optical film.

A manufacturing method and a stretching process (control of the refractive index) of the first and the second optical films, and a polarizing plate and a liquid crystal display employing the first and the second optical films will be described below.

(Manufacturing Method)

The manufacturing method of the optical film used in the present invention will be described.

A film manufactured by a solution casting method or a melt casting method may be preferably used for the first and the second optical films used in the present invention.

The first and the second optical films used in the present invention is manufactured by a process of preparing dope in which cellulose ester and additives are dissolved in a solvent, a process of casting the dope on running endless metal support, a process of drying the cast dope as a web, a process of separating from the metal support, a process of stretching or maintaining the width, a process of drying thither, and a process of winding the finished film.

A process to prepare a dope will be now described. The concentration of cellulose in a dope is preferably the higher with respect to decreasing a drying load after the dope has been cast on a metal support, while, when the concentration of cellulose ester is excessively high, filtering precision will be deteriorated due to an increased load at the time of filtering. The concentration to balance these is preferably 10 to 35 percent by mass and more preferably 15 to 25 percent by mass.

A solvent utilized in a dope of the present invention, one type alone or at least two types in combination may be utilized, however, a good solvent and a poor solvent of cellulose ester are preferably utilized in combination with respect to manufacturing efficiency. A preferable range of a mixing ratio of a good solvent to a poor solvent is 70 to 98 percent by mass of good solvent to 2 to 30 percent by mass of a poor solvent. As a good solvent and a poor solvent, one dissolves cellulose ester, which is utilized, by itself alone is defined as a good solvent and one swells or can not dissolve cellulose ester is defined as a poor solvent. Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate, while it becomes a poor solvent for acetic ester of cellulose (an acetyl substitution degree of 2.8) of cellulose.

A good solvent utilized in the present invention is not specifically limited, however, includes an organic halogen compound such as methylene chloride, dioxolan, acetone, methylacetate and methyl acetoacetate. Methylene chloride and methyl acetate are specifically preferable.

Further, a poor solvent utilized in the present invention is not specifically limited, however, such as methanol, ethanol, n-butanol, cyclohexane and cyclohexanone are preferably utilized. Further, a dope preferably contains 0.01 to 2 percent by mass of water. Further, as a solvent utilized for dissolution of cellulose ester, a solvent removed from film by drying in a film casting process is recovered and reused, after purified if necessary.

As a dissolution method of cellulose ester at the time of preparation of the dope described above, a general method can be employed. By combination of heating and increased pressure, it is possible to heat up to higher than a boiling point at an ordinary pressure. It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high. The heating temperature is preferably 45 to 120° C., more preferably 60 to 110° C. and still more preferably 70 to 105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small. Therefore, the absolute filtering precision of a filter medium is preferably not larger than 0.008 mm, more preferably 0.001 to 0.008 mm and furthermore preferably 0.003 to 0.006 mm.

The material of a filter medium is not specifically limited and an ordinary filter medium can be utilized, however, a filter medium made of plastic such as polypropylene and TEFLON® and a filter medium made of metal such as stainless steel are preferable because of such as no release of fiber of a filter medium. It is preferable to eliminate and reduce impurities, particularly foreign materials causing a bright spot defect having been contained in cellulose ester as a raw material by filtration.

Foreign materials causing bright spot defects means a spot (a foreign material) which is visible due to light leak, when two sheets of polarizing plates, between which an optical film is placed, are arranged in a crossed Nicols state, and light is irradiated from one of the polarizing plate side to be observed from the other polarizing plate side. The number of bright spots having a diameter of not less than 0.01 mm is preferably not more than 200 spots/cm$^2$. More preferably not more than 100 spots/cm$^2$, furthermore preferably not more than 50 spots/cm$^2$ and most preferably 0 to 10 sport/cm$^2$. Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures before and after filtering (referred to as a pressure difference). The preferable temperature is 45 to 120° C., more preferably 45 to 70° C. and furthermore preferably 45 to 55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is mirror finished, is utilized. The cast width can be set to 1 to 4 m. The surface temperature of a metal support in a cast process is from −50° C. to lower than a boiling point of a solvent and it is preferable the temperature is the higher since web drying speed is fast; however, excessively high temperature may sometimes cause foaming of a web or deterioration of flatness. The support temperature is preferably 0 to 40° C. and more preferably 5 to 30° C. It is also a preferable method to make a web gelled by cooling and to peel off the web from a drum with a plenty of residual solvent contained. A method to control the temperature of a metal support is not specifically limited, however, there are a method to blow a hot wind or a cold wind on the web and a method to make hot water contact the rear side of a metal support. A method to utilize hot water is preferable because time required to make a metal support become a constant temperature is short due to more efficient heat transfer by use of a hot water. In the case of employing a hot wind, a wind of a temperature higher than the aimed temperature may be employed.

To provide a good flatness of an optical film, the residual solvent amount at the time of peeling off a web from a metal support is preferably 10 to 150 percent by mass, more preferably 20 to 40 percent by mass or 60 to 130 percent by mass and specifically preferably 20 to 30 percent by mass or 70 to 120 percent by mass.

A residual solvent amount is defined by the following formula in the present invention.

Residual solvent amount (percent by mass)= $\{(M-N)/N\} \times 100$

Herein, M is a mass of a sample picked at an arbitrary time during or after manufacturing of a web or film and N is a mass after heating at 115° C. for 1 hour.

Further, in a drying process of the optical film, a web is preferably peeled off from a metal support and further dried to make a residual solvent amount of not more than 1 percent by mass, more preferably not more than 0.1 percent by mass and specifically preferably 0 to 0.01 percent by mass.

In a film drying process, a roll drying method (in which a web is dried while being alternately passed through many rolls which are arranged up and down) or a method to dry a web while being transported by a tenter method will be applied.

It is specifically preferable that a web is stretched in the width direction by means of a tenter method to grip the both edges of the web by such as clips to prepare optical film of the present invention. It is preferable to peel off at a peel-off tension of not less than 300 N/m.

A means to dry a web is not specifically limited, and it can be generally performed by such as a hot wind, infrared rays, a heat roll and microwaves, however, preferably performed by a hot wind with respect to convenience.

Drying temperature in a drying process of a web is preferably 40 to 200° C. and stepwise raised.

The layer thickness of optical film is not specifically limited; however, a layer thickness of 10 to 200 µm is applied. The layer thickness is specifically preferably 10-100 µm and furthermore preferably 20 to 60 µm.

Optical film of the present invention has a width of 1 to 4 m. The width is preferably 1.4 to 4 m and specifically preferably 1.6 to 3 m. When the width exceeds 4 m, the transportation becomes difficult.

(Stretching Operation, Refractive Index Control)

In the manufacturing process of the first optical film and the second optical film used in the present invention, it is preferable to conduct refractive index control, namely, control of retardation via a stretching operation.

For example, successive or simultaneous biaxial stretching or uniaxial stretching can be carried out in the longitudinal direction of film (the cast direction) and in the direction perpendicular thereto in the film plane, that is, in the width direction.

The stretching ratios in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., and more preferably 160° C. to 200° C.

It may be preferable to stretch a film under the condition where the content of the residual solvent in the film is 20 to 0%, and more preferably 15 to 0%. More concretely, the film is preferably stretched under the condition that the content of the residual solvent is 11% at 175° C., or the content of the residual solvent is 2% at 175° C. Otherwise, the content of the residual solvent is 11% at 185° C., or the content of the residual solvent is not higher than 1% at 185° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of cause, these methods can be utilized in combination. In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of the optical film of the present invention preferably is present in a film plane and θ1 is preferably not less than −1° and not more than +1°, and more preferably not less than −0.5° and not more than +0.5°, when the angle against the casting direction is θ1. This θ1 can be defined as an orientation angle, and measurement of θ1 can be performed by use of automatic birefringence meter KOBRA-21ADH (Oji Scientific Instruments). To satisfy the above-described relationships by θ1 can contributes to obtain a high luminance and to restrain or prevent light leakage, and to obtain good fidelity color reproduction in a color liquid crystal display.

(Physical Properties)

Moisture permeability of the first optical film and the second optical film used in the present invention is preferably 10 to 1,200 g/m$^2$.24 h at 40° C., 90% RH. Moisture permeability can be measured according to a method described in JIS Z 0208.

Elongation percentage of the first optical film and the second optical film used in the present invention is preferably 10 to 80%.

Visible light transmittance of the first optical film and the second optical film used in the present invention is preferably not less than 90% and more preferably not less than 93%.

Haze of the first optical film and the second optical film used in the present invention is preferably less than 1% and specifically preferably 0 to 0.1%.

Further, if a liquid crystal layer is coated on the first optical film and the second optical film used in the present invention, retardation values extending over a more wide range may be obtained.

(Polarizing Plate)

The first optical film and the second optical film used in the present invention can be used in a polarizing plate employing a polarizing plate protective film and a liquid crystal display employing the polarizing plate. The first optical film and the second optical film used in the present invention are preferably used as a film having a function of a polarizing plate protective film, whereby the thickness of the liquid crystal display can be reduced and the manufacturing process of the liquid crystal display can be simplified, since there is no need to provide another optical film having a retardation in addition to a polarizing plate protective film.

In the polarizing plate of the present invention, it is preferable that the first optical film and the second optical film used in the present invention each are used as an optical film which also works as a polarizing plate protective film. It is preferable in the liquid crystal display of the present invention that the polarizing plates of the present invention are adhered on both the surfaces of a liquid crystal cell through an adhesive layer.

A polarizing plate of the present invention can be prepared by an ordinary method. The first optical film and the second optical film used in the present invention, the polarizer side of which is subjected to an alkaline saponification treatment, is preferably adhered up on at least one surface of a polarizer which has been prepared by immersion stretching in an iodine solution, by use of a completely saponificated type polyvinyl alcohol aqueous solution. On the other surface, another polarizing plate protective film may be utilized. It is necessary that the first optical film and the second optical film used in the present invention are provided on the liquid crystal cell side of the polarizer, and a conventional polarizing plate protective film may be used on the outside of the polarizer.

For example, as a conventional polarizing plate protective film, commercially available cellulose ester film (such as Konica Minolta TAC KC8UX, KC5UX, KC8UCR3, KC8UCR4, KC8UCR5, KC8UY, KC6UY, KC4UY, KC4UE, KC8UE, KC8UY-HA, KC8UX-RHA, KC8UXW-RHA-C, KC8UXW-RHA-NC, and KC4UXW-RHA-NC manufactured by Konica Minolta Opto. Inc.) is also preferably utilized.

Onto the polarizing plate protective film used for the surface side of a display unit, it is desirable to provide an antireflection layer, an antistatic layer, an antifouling layer, and a back coat layer in addition to an antiglare layer or a clear hard coat layer.

A polarizer as a primary composing element of the polarizing plate is an element to pass light of a polarized wave plane of a predetermined direction, and a typical polarizer known at present is polyvinyl alcohol type polarizing film, which includes polyvinyl alcohol film dyed with iodine and one dyed with dichroic dye.

As a polarizer, utilized is one in which a polyvinyl alcohol aqueous solution is made to film, and the obtained film is uniaxially stretched and dyed, or is uniaxially stretched after having been dyed, preferably followed by being subjected to a durability treatment with a boron compound. The layer thickness of a polarizer is preferably 5 to 30 μm and specifically preferably 10 to 20 μm.

(Liquid Crystal Display)

By using the optical film used in the present invention for a VA (MVA, PVA) node liquid crystal display, various kinds of liquid crystal displays excellent in visibility can be produced.

Specifically, even if a liquid crystal display has a large screen more than 30 type, it is possible to obtain a liquid crystal display exhibiting reduced coloring in a black display mode and excellent visibility, for example, front contrast.

EXAMPLES

The present invention will be explained below with referring to examples, however, the present invention is not limited thereto.

<Preparation of Cellulose Ester Films 101-104>
<Particle Dispersion Liquid 1>

| | |
|---|---|
| Particles (AEROSIL R972V, manufactured by Nippon Aerosil Co., Ltd.) | 11 parts by mass |
| Ethanol | 89 parts by mass |

These were mixed and agitated for 50 minutes by means of dissolver and then dispersed by Manton-Gaurin.

Particle dispersion liquid 1 was added slowly in a dissolution tank charged with methylene chloride while sufficiently agitating. Dispersion was carried out by an attritor mill so that particle diameter of secondary particles reached to a predetermined size. The resultant was filtered by FINEMET NT manufactured by Nippon seisen Co. Ltd, and Microparticles addition liquid 1 for in-line addition was obtained.

<Particle Addition Liquid 1>

| | |
|---|---|
| Methylene chloride | 99 parts by mass |
| Particle dispersion liquid 1 | 5 parts by mass |

Main dope liquid 1 of the following composition was prepared. First, methylene chloride and ethanol were added to a pressure dissolution tank. Cellulose ester A was supplied into the pressure solution tank storing a solvent while being agitated. Then, it was dissolved completely while being heated and agitated. The resultant liquid was filtered by the use of Azumi filter paper No. 244 manufactured by Azumi Filter Paper Co., Ltd., whereby the main dope liquid was prepared.

<Composition of Main Dope Liquid 1>

| | |
|---|---|
| Methylene chloride | 340 parts by mass |
| Ethanol | 64 parts by mass |
| Cellulose ester A of which propionyl substitution degree was 0.9 and acetyl substitution degree was 1.56 | 100 parts by mass |
| Polyester compound 14 | 6.5 parts by mass |
| Saccharide ester compound 3 | 6.0 parts by mass |
| Particle addition liquid 1 | 1 parts by mass |

The above substances were put into a sealed container and dissolved while being agitated, whereby Dope liquid 1 was prepared. Subsequently, by the use of an endless belt type casting apparatus, the dope liquid was uniformly cast on a stainless steel belt support at the temperature of 33° C. with a 1500 mm width. The temperature of the stainless steel belt was controlled at 30° C.

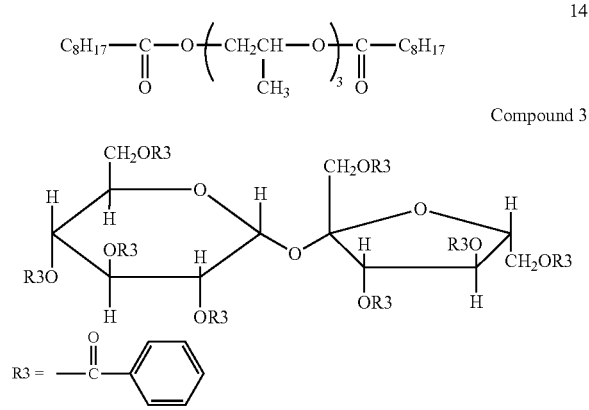

Compound 3

The solvent was evaporated on the stainless belt support until the remaining solvent amount in the cast film became 75%, and then the cast film was peeled from the stainless steel belt support with a peeling force of 130 N/m.

The peeled cellulose ester film was stretched 36% in the width direction by the use of a tenter under the application of heat of 150° C. The residual solvent at the time of starting the stretching was 15%.

Subsequently, the drying of the cellulose ester film was completed while the cellulose ester film was being conveyed through a drying zone with many rolls. A drying temperature was 130° C. and conveying tension was 100 N/m.

As mentioned above, Cellulose ester film 101 with a dried film thickness of 40 μm was obtained. Hereafter, Cellulose ester films 102 and 103 were produced almost in the similar manner as the preparation of cellulose ester film 101 except that the thicknesses and the stretching conditions were changed as shown in Table 1.

TABLE 1

| CELLULOSE ESTER FILM | MANUFACTURING CONDITION | | | |
|---|---|---|---|---|
| | DOPE LIQUID | STRETCHING RATIO | FILM THICKNESS (μm) | STRETCHING TEMPERATURE (° C.) |
| 101 | 1 | 1.35 | 39 | 150 |
| 102 | 1 | 1.45 | 50 | 170 |
| 103 | 1 | 1.36 | 37 | 155 |

A cellulose ester film having a thickness of 30 μm was obtained in the same manner as described for Cellulose ester film 101. The obtained film was stretched by 30% in the MD direction at 170° C. without keeping the width of the film to obtain Cellulose ester film 104 having a dry thickness of 28 μm.

<Preparation of Cellulose Ester Films 105 and 106>

Main dope liquid 2 was prepared by mixing the components listed below, and a cellulose ester film having a dry thickness of 60 μm was prepared in a similar manner to the preparation of Cellulose ester film 101. The obtained film was stretched by 25% in the MD direction at 185° C. while keeping the width of the film to obtain Cellulose ester film 105 having a dry thickness of 50 μm. A cellulose ester film obtained in a similar manner to the preparation of Cellulose ester film 101 having a dry thickness of 30 μm was stretched by 30% in the MD direction at 190° C. without keeping the width of the film to obtain Cellulose ester film 106 having a dry thickness of 29 μm.

<Composition of Main Dope Liquid 2>

| | |
|---|---|
| Methylene chloride | 340 parts by mass |
| Ethanol | 64 parts by mass |
| Cellulose ester A of which propionyl substitution degree was 0.9 and acetyl substitution degree was 1.56 | 100 parts by mass |
| Polymethyl acrylate | 6.5 parts by mass |
| Particle addition liquid 1 | 1 parts by mass |

<Preparation of Cellulose Ester Film 107>

Main dope liquid 3 was prepared by mixing the components listed below, and a cellulose ester film having a dry thickness of 35 μm was prepared in a similar manner to the preparation of Cellulose ester film 101. The obtained film was stretched by 16% in the MD direction at 145° C. while keeping the width of the film to obtain Cellulose ester film 107 having a dry thickness of 29 μm.

<Composition of Main Dope Liquid 3>

| | |
|---|---|
| Methylene chloride | 340 parts by mass |
| Ethanol | 64 parts by mass |
| Cellulose ester B of which propionyl substitution degree was 1.06 and acetyl substitution degree was 1.12 | 100 parts by mass |
| Trimethylolpropane tribenzoate | 7.1 parts by mass |
| Particle addition liquid 1 | 1 parts by mass |

<Preparation of Cellulose Ester Films 108-111>

The components listed below were charged in a mixing tank, and the components were dissolved by agitating while heating to prepare Main dope liquid 4.

<Composition of Main Dope Liquid 4 for Cellulose Ester Film 108>

| Cellulose triacetate of which acetylation degree was 60.9% | 100 parts by mass |
|---|---|
| Methylene chloride | 318 parts by mass |
| Methanol | 47 parts by mass |

In another mixing tank the components listed below were agitated while heating to prepare a retardation controlling agent solution, and 474 mass parts of the cellulose acetate solution and 36 mass parts of the retardation controlling agent solution were mixed, followed by sufficiently agitating, to prepare a dope.

<Composition of Retardation Controlling Agent Solution 1>

| (mass parts in 100 mass parts of cellulose acylate) | |
|---|---|
| Methylene chloride | 87 parts by mass |
| Methanol | 47 parts by mass |
| Disk-like compound 222 | 3 parts by mass |

(222)

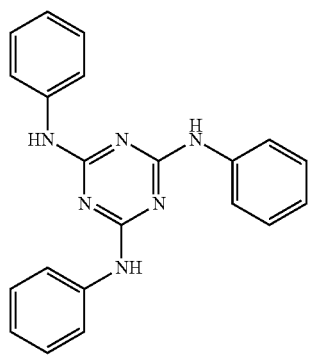

The obtained dope was cast using a band casting machine to obtain Cellulose ester film 108 having a dry thickness of 90 μm.

A cellulose ester film having a dry thickness of 35 μm was prepared in a similar manner to the preparation of Cellulose ester film 108 except that the retardation controlling agent solution was changed to one described below. The obtained film was stretched by 15% in the MD direction at 160° C. while keeping the width of the film to obtain Cellulose ester film 109 having a dry thickness of 29 μm. Similarly, the obtained film was stretched by 25% in the MD direction at 160° C. while keeping the width of the film to obtain Cellulose ester film 109 having a dry thickness of 25 μm. Similarly, the obtained film was stretched by 10% in the MD direction at 150° C. while keeping the width of the film to obtain Cellulose ester film 111 having a dry thickness of 32 μm.

<Composition of Retardation Controlling Agent Solution 2>

| (mass parts in 100 mass parts of cellulose acylate) | |
|---|---|
| Methylene chloride | 87 parts by mass |
| Methanol | 47 parts by mass |
| Disk-like compound 295 | 3 parts by mass |

(295)

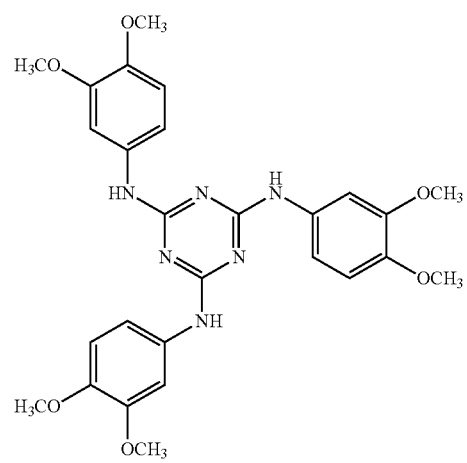

<Preparation of Polymer Films 112-114>

Polymer film 112 having a thy thickness of 60 μm was prepared by stretching a norbomane film (product name ZEONOR® produced by ZEON Corp.) 1.41 times in X direction and 1.15 times in Y direction at 180° C. Also, Polymer film 113 having a thy thickness of 40 μm was prepared by stretching a norbomane film by 27% in the MD direction and at 155° C. while keeping the width of the film, followed by stretching by 35% in the TD direction using a tenter. Further, Polymer film 114 having a thy thickness of 62 μm was prepared by stretching a norbomane film 1.39 times in X direction and 1.14 times in Y direction at 179° C.

<<Measurement of Retardation Ro and Rt>>

A sample was cut out with a size of 35 mm×35 mm from each sample, and moisture conditioned under an ambience of 25° C., 55% RH. Retardation values were calculated using the value extrapolated from the value measured from a vertical direction and the value similarly measured while the film surface was inclined, at a wavelength of 590 nm by use of an automatic birefringence analyzer (KOBRA-21ADH manufactured by Oji Scientific Instruments).

The calculation of the retardation values will be further detailed below.

The in-plane retardation value Ro is measured using light of 590 nm incident from a normal line direction of the film in KOBRA21ADH. The Rth value is calculated according to the following method, when the film to be measure is expressed as a uniaxial or a biaxial refractive index ellipsoid.

The measurements are carried out at 6 points, while rotating the sample using the in-plane slow axis (determined by KOBRA21ADH) as an inclination axis (rotating axis), at directions from the normal line direction of the film to 50 degree on one side from the normal line direction inclined with a step of 10 degree (when there is no slow axis in the film, an arbitrary axis in the film plane is used as a rotating axis), and using light of 590 nm. The retardation value in the thickness direction Rth is calculated by inputting the data of the above measured retardation values, an assumed average refractive index, and the thickness of the film in KOBRA21ADH.

In the above measurement, the value of an average refractive index can be measured with an Abbe's refractometer (4T), when this value is not known. By inputting the assumed average refractive index and the thickness of the film, KOBRA21ADH calculates nx, ny, and nz.

The results are shown in Table 2.
<Preparation of Polarizing Plate>

A polyvinyl alcohol film having a thickness of 120 μm was uniaxially stretched (temperature: 110° C., stretching ratio: 5 times).

The film was immersed in an aqueous solution of 0.075 g iodine, 5 g potassium iodide, and 100 g water for 60 seconds, and then immersed in a 68° C. aqueous solution of 6 g potassium iodide, 7.5 g boric acid and 100 g water. The film was washed and dried to obtain a polarizer film.

Next, the polarizer film and each of the Cellulose ester films 101 to 111, Polymer films 112 to 114 were pasted onto the front side and a Konica Minolta TAC KC4UY (cellulose ester film manufactured by Konica Minolta Opto. Inc.) was pasted on the back side in accordance with the following steps 1 to 5. Thus, the polarizing plates were prepared.

Step 1: Cellulose ester films 101 to 111 each of which was subjected to saponification on the side to be pasted to a polarizer were obtained by immersing each film for 90 seconds in 2 mol/L of sodium hydroxide solution at 60° C., followed by washing and drying.

Step 2: Above mentioned polarizer was immersed in a tank of polyvinyl alcohol adhesive having a solid content of 2 mass % for 1 to 2 seconds.

Step 3: Excess adhesive attached to the polarizer film in Step 2 was gently wiped off and then the polarizer film was placed on the cellulose ester film processed in Step 1.

Step 4: Each of the cellulose ester films 101 to 111 and the polarizer film which were stacked in Step 3, and a cellulose ester films on the back side were pasted together at a pressure of 20-30 N/cm$^2$ and a conveyance speed of approximately 2 m/minute.

Step 5: The samples in which the polarizing cellulose ester films 101 to 111, and Konica Minolta TAC KC4UY prepared in Step 4 were dried for 2 minutes in a dryer at 80° C., whereby the polarizing plates were prepared.

The pasting of each of Polymer films 112 to 114 was carried out using an acrylic adhesive without conducting above mentioned saponification to obtain a polarizing plate.
<Fabrication of a Liquid Crystal Display>

A liquid crystal panel to perform viewing angle measurement was fabricated as follows, and the characteristics as a liquid crystal display was evaluated.

The polarizing plates preliminarily pasted on both sides of a VA mode liquid crystal display (BRAVIAV1, 40 inch size, manufactured by SONY Corp.) were removed, and the polarizing plates 101 to 111, and Polymer films 112 to 114, which were prepared as mentioned above were pasted onto both sides of a glass surface of a liquid crystal cell so as to meet the combination shown in Table 2.

At this time, each of the polarizing plates was pasted in such a manner that the plane of the cellulose ester film of the present invention became the liquid crystal cell side and the absorption axis was directed to the same direction as that of the preliminarily pasted polarizing plate. Thus, Liquid crystal displays 301 to 312 were fabricated.

These liquid crystal displays were evaluated in terms of a viewing angle, color shift, and luminance in a black display. The results are shown in Table 2.

In Table 2, "the R value is HETERO" means that the Ro values and Rth values of the first optical film and the second optical film are different, and "the R value is HOMO" means that the Ro values and Rth values of the first optical film and the second optical film are equal. Also, "DSP is HETERO" means that the wavelength dispersion properties of the first optical film and the second optical film are different, and "DSP is HOMO" means that the wavelength dispersion properties of the first optical film and the second optical film are equal.
<<Evaluation of Viewing Angle>>

In the condition of 23° C., 55% RH, after the backlight of each liquid crystal display was continuously lighted for one week, the measurement was performed. EZ-Contrast 160D manufactured by ELDIM was used for the measurement in such a way that the luminance observed at the direction 60° from the normal line of the display screen was measured in a white display mode and a black display mode of the liquid crystal display, and the ratio of the luminance values in the white display mode and the black display mode (referred to as 60° contrast) was designated as the "viewing angle".

Also, the ratio of the luminance values in the white display mode and the black display mode, when viewed from the normal line direction, was measured and designated as the "front contrast"

[Evaluation Criteria of Viewing Angle]
A: The 60° contrast is 100 or more.
B: The 60° contrast is 90 or more but less than 100.
C: The 60° contrast is 80 or more but less than 90.
D: The 60° contrast is less than 80.
<<Evaluation of Color Shift>>

On each liquid crystal display fabricate as described above, variation of color was measured using a measurement instrument (EZ-Contrast 160D, product made by ELD1M). The maximum color variation Δxy in the vertical direction of a CIE1931, xy chromaticity diagram between the neutral color (x, y)=(0.313, 0.34), when the D65 light source is assumed to be neutral, and the color at an incline angle θ=60° and azimuth angle ϕ=45° was compared.

[Evaluation Criteria of Color Shift]
A: Δxy is less than 0.05.
B: Δxy is 0.05 or more but less than 0.07.
C: Δxy is 0.07 or more but less than 0.09.
D: Δxy is 0.09 or more.
<<Evaluation of Transmittance, and Luminance>>

On each of liquid crystal displays 301-312, the transmittance and the luminance in the black display mode based on the CIE1976 L*a*b* color space were measured while the polarizing plates were adhered in a cross Nicol condition using a spectrophotometer U3100 by Hitachi, Ltd.

A: L* is less than 0.005 cd/m$^2$.
B: L* is 0.005 cd/m$^2$ or more but less than 0.010 cd/m$^2$.
C: L* is 0.010 cd/m$^2$ or more.

In Liquid crystal display 301 (Example 1), a film which is Ro predominant and exhibits a reverse wavelength dispersion is provided on the viewer side (T2) of the liquid crystal cell as the first optical film, and a film which is Rth predominant and exhibits a normal wavelength dispersion is provided on the backlight side (T3) of the liquid crystal cell as the second optical film. It is understood that Liquid crystal display 301 exhibits excellent viewing angle, color shift and black luminance.

In Liquid crystal display 302 (Example 2), T2 and T3 are constructed reversely to those in Liquid crystal display 301, namely, a film which is Ro predominant and exhibits a reverse wavelength dispersion is provided on the backlight side (T3) of the liquid crystal cell as the first optical film, and a film which is Rth predominant and exhibits a normal wavelength dispersion is provided on the viewer side (T2) of the liquid crystal cell as the second optical film. It is also understood that Liquid crystal display 302 exhibits excellent viewing angle, color shift and black luminance.

In Liquid crystal display 303 (Example 3), the second optical film is different from that of Liquid crystal display

301, namely, a film which is Ro predominant and exhibits a reverse wavelength dispersion is provided on the viewer side (T2) of the liquid crystal cell as the first optical film, and a film which is Rth predominant and exhibits a flat wavelength dispersion is provided on the backlight side (T3) of the liquid crystal cell as the second optical film. It is understood that, while color shift of Liquid crystal display 303 is inferior to that of Liquid crystal display 301, it exhibits excellent viewing angle and black luminance.

With respect to Liquid crystal display 304 (Example 4), the features of the display are almost the same as those of Liquid crystal display 303, however, since a cellulose ester film is used as the second optical film contrary to Liquid crystal display 303 in which a norbomane film is used as the second optical film, it becomes possible to adhere the film via a saponification treatment.

When compared with Liquid crystal displays 301 to 304, in Liquid crystal display 308 (Comparative example 1), the film which is Ro predominant and the film which is Rth predominant both exhibit the same reverse wavelength dispersion property. It is understood that Liquid crystal display 308 exhibits excellent viewing angle and black luminance, however, exhibits poor color shift.

In Liquid crystal display 309 (Comparative example 2), the wavelength dispersion properties of the first optical film and the second optical film are provided reversely to those in Liquid crystal display 301, namely the film which is Ro predominant exhibits a normal wavelength dispersion property and the film which is Rth predominant exhibits a reverse wavelength dispersion property. It is understood that Liquid crystal display 309 exhibits poor viewing angle as well as poor color shift.

In Liquid crystal display 305 (Example 5), the retardation values of the second optical film are different from those of Liquid crystal displays 301-304, in which the first optical film is more Ro predominant and the second optical film is more Rth predominant. It is understood that Liquid crystal display 305 exhibits excellent viewing angle and color shift, however, exhibits not excellent black luminance.

In Liquid crystal display 306 (Example 6), the wavelength dispersion properties of the first optical film are of more reverse wavelength dispersion properties. It is understood that, although Liquid crystal display 306 exhibits not excellent black luminance which is similar to that of Liquid crystal display 305, it exhibits excellent viewing angle and color shift.

In Liquid crystal display 307 (Example 7), the wavelength dispersion properties of the second optical film are different from those of Liquid crystal display 305, and a film which is Rth predominant and exhibits a flat wavelength dispersion is provided on the backlight side (T3) of the liquid crystal cell as the second optical film. It is understood that, although Liquid crystal display 306 exhibits not excellent black luminance which is similar to that of Liquid crystal display 305, it exhibits excellent viewing angle and color shift.

In Liquid crystal display 310 (Comparative example 3), as a comparative example to Liquid crystal displays 301-307, films which exhibit the same retardation values and the same wavelength dispersion properties of the retardation values are provided for T2 and T3 and it is understood that it exhibits both not excellent viewing angle and color shift. In Liquid crystal display 311 (Comparative example 4), films which exhibit the same retardation values are provided for T2 and T3 but the wavelength dispersion properties are different. It is understood that Liquid crystal display 311 also exhibits both poor viewing angle and color shift. In Liquid crystal display 312 (Comparative example 5), a film which is an A plate which compensates Ro and is of a reverse wavelength dispersion property is provided for T2 and a film which is a C plate which compensates Rth and is of a normal wavelength dispersion property is provided for T3. It is understood that Liquid crystal display 312 exhibits excellent viewing angle and color shift but exhibits poor black luminance.

It is clear from Table 2 that Liquid crystal displays 301-307 of the present invention exhibit excellent properties in viewing angle, color shift and black luminance.

TABLE 2

|  |  | EXAMPLE 1 301 | EXAMPLE 2 302 | EXAMPLE 3 303 | EXAMPLE 4 304 | EXAMPLE 5 305 | EXAMPLE 6 306 |
|---|---|---|---|---|---|---|---|
| R VALUE |  | HETERO | HETERO | HETERO | HETERO | HETERO | HETERO |
| DSP |  | HETERO | HETERO | HETERO | HETERO | HETERO | HETERO |
| T2 |  | 102 | 109 | 102 | 102 | 104 | 106 |
| Ro | nm | 67 | 47 | 67 | 67 | 80 | 80 |
| Rth | nm | 120 | 130 | 120 | 120 | 80 | 85 |
| $DSP_{Ro}$ | *1 | 0.96 | 1.06 | 0.96 | 0.96 | 0.96 | 0.85 |
| $DSP_{Rth}$ | *2 | 0.95 | 1.06 | 0.95 | 0.95 | 0.95 | 0.86 |
| T3 |  | 109 | 102 | 112 | 107 | 111 | 111 |
| Ro | nm | 47 | 67 | 47 | 47 | 20 | 20 |
| Rth | nm | 130 | 120 | 130 | 130 | 150 | 150 |
| $DSP_{Ro}$ | *1 | 1.06 | 0.96 | 1.01 | 0.98 | 1.06 | 1.06 |
| $DSP_{Rth}$ | *2 | 1.06 | 0.95 | 1.00 | 0.99 | 1.06 | 1.06 |
| VIEWING ANGLE |  | A | B | B | B | B | A |
| COLOR SHIFT |  | A | B | C | C | B | A |
| BLACK LUMINANCE | L* | A | A | A | A | B | B |

|  |  | EXAMPLE 7 307 | COMP. 1 308 | COMP. 2 309 | COMP. 3 310 | COMP. 4 311 | COMP. 5 312 |
|---|---|---|---|---|---|---|---|
| R VALUE |  | HETERO | HETERO | HETERO | HOMO | HOMO | HETERO |
| DSP |  | HETERO | HOMO | HETERO | HOMO | HETERO | HETERO |
| T2 |  | 104 | 102 | 110 | 101 | 114 | 105 |
| Ro | nm | 80 | 67 | 67 | 52 | 52 | 142 |
| Rth | nm | 80 | 120 | 120 | 125 | 125 | 77 |
| $DSP_{Ro}$ | *1 | 0.96 | 0.96 | 1.06 | 0.96 | 1.01 | 0.85 |

TABLE 2-continued

| | | | | | | | |
|---|---|---|---|---|---|---|---|
| $DSP_{Rth}$ | *2 | 0.95 | 0.95 | 1.06 | 0.95 | 1.00 | 0.86 |
| T3 | | 113 | 103 | 103 | 101 | 101 | 108 |
| Ro | nm | 20 | 47 | 47 | 52 | 52 | 2 |
| Rth | nm | 150 | 130 | 130 | 125 | 125 | 178 |
| $DSP_{Ro}$ | *1 | 1.01 | 0.96 | 0.96 | 0.96 | 0.96 | 1.05 |
| $DSP_{Rth}$ | *2 | 1.00 | 0.95 | 0.95 | 0.95 | 0.95 | 1.06 |
| VIEWING ANGLE | | B | B | D-B | C | D | B |
| COLOR SHIFT | | B | D | D-C | C | D | B |
| BLACK LUMINANCE | L* | B | A | A | A | A | C |

*1: Ro(450)/Ro(630)
*2: Rth(450)/Rth(630)
COMP.: COMPARATIVE EXAMPLE

DESCRIPTION OF NUMERALS

1 Liquid crystal cell
2a and 2b Polarizing plate
3a and 3b Polarizer
4a and 4b Polarizing plate protective film
5 First optical film
6 Second optical film

What is claimed is:

1. A vertical alignment mode liquid crystal display comprising:
    a liquid crystal cell;
    a first polarizer and a second polarizer arranged so as to sandwich the liquid crystal cell;
    a first optical film arranged between the first polarizer and the liquid crystal cell; and
    a second optical film arranged between the liquid crystal cell and the second polarizer, wherein
    the first optical film and the second optical film each are a resin film having an optically biaxial property, and
    the first optical film and the second optical film meet following Formulae (1) and (2), $$20 \leq Ro_1 - Ro_2 \leq 60 \quad \text{Formula (1)}$$

$$10 \leq Rth_2 - Rth_1 \leq 70 \quad \text{Formula (2)}$$

wherein
    $Ro_1$ and $Ro_2$ represent in-plane retardation values Ro (nm) of the first optical film and the second optical film, respectively, measured with light of a wavelength of 590 nm, $Ro_1$ and $Ro_2$ each being represented by Formula (I), $Rth_1$ and $Rth_2$ represent retardation values in the thickness direction Rth (nm) of the first optical film and the second optical film, respectively, measured with light of a wavelength of 590 nm, $Rth_1$ and $Rth_2$ each being represented by Formula (II), $$Ro = (nx - ny) \times d \quad \text{Formula (I)}$$

$$Rth = \{(nx + ny)/2 - nz\} \times d \quad \text{Formula (II)}$$

wherein
    nx represents a refractive index in direction x in which the refractive index is largest in an optical film plane, ny represents a refractive index in a direction perpendicular to direction x in the optical film plane, and nz represents a refractive index in the thickness direction of the optical film and d (nm) represents a thickness of the optical film, and
    the first optical film and the second optical film meet following Formulae (3) and (4), $$DSP_{Ro1} < DSP_{Ro2} \quad \text{Formula (3)}$$

$$DSP_{Rth1} < DSP_{Rth2} \quad \text{Formula (4)}$$

wherein
    $DSP_{Ro1}$ and $DSP_{Ro2}$ represent wavelength dispersion properties of the in-plane retardation value Ro of the first optical film and the second optical film, respectively, $DSP_{Ro1}$ and $DSP_{Ro2}$ being expressed as $Ro_1(450)/Ro_1(630)$ and $Ro_2(450)/Ro_2(630)$, respectively, and
    $DSP_{Rth1}$ and $DSP_{Rth2}$ represent wavelength dispersion properties of the retardation value in the thickness direction Rth of the first optical film and the second optical film, respectively, $DSP_{Rth1}$ and $DSP_{Rth2}$ being expressed as $R_{th1}(450)/R_{th1}(630)$ and $R_{th2}(450)/R_{th2}(630)$, respectively,
    wherein
    Ro(450) and Ro(630) represent retardation values Ro represented by Formula (I) at wavelengths of 450 nm and 630 nm, respectively, and Rth(450) and Rth(630) represent retardation values Rth represented by Formula (II) at wavelengths of 450 nm and 630 nm, respectively.

2. The vertical alignment mode liquid crystal display of claim 1, wherein the first optical film is provided on a viewer side of the liquid crystal cell.

3. The vertical alignment mode liquid crystal display of claim 1,
    wherein
    the first optical film exhibits a reverse wavelength dispersion property of the in-plane retardation value $DSP_{Ro1}$ in a visible light region, and
    the second optical film exhibits a normal wavelength dispersion property of the retardation value in the thickness direction $DSP_{Rth2}$ in the visible light region.

4. The vertical alignment mode liquid crystal display of claim 1,
    wherein
    the wavelength dispersion property of the in-plane retardation value of the first optical film $DSP_{Ro1}$ meets $0.71 \leq DSP_{Ro1} \leq 0.90$, and
    the wavelength dispersion property of the retardation value in the thickness direction of the second optical film $DSP_{Rth2}$ meets $1.06 \leq DSP_{Rth2} \leq 1.30$.

5. The vertical alignment mode liquid crystal display of claim 1,
    wherein
    the first optical film exhibits a reverse wavelength dispersion property of the in-plane retardation value $DSP_{Ro1}$, the second optical film exhibits a normal wavelength dispersion property of the retardation value in the thickness direction $DSP_{Rth2}$, and wavelength dispersion properties of the in-plane retardation value and the retardation value in the thickness direction of the first optical film and the second optical film meets following Formulae (5) and (6), $$DSP_{Ro2}-DSP_{Ro1} \geq 0.1 \quad \text{Formula (5)}$$

$$DSP_{Rth2}-DSP_{Rth1} > 0.1. \quad \text{Formula (6)}$$

6. The vertical alignment mode liquid crystal display of claim 1,
wherein
the in-plane retardation value and the retardation value in the thickness direction of the first optical film meet $40 \leq Ro_1 \leq 100$ and $70 \leq R_{th1} \leq 120$, and
the in-plane retardation value and the retardation value in the thickness direction of the second optical film meet $10 \leq Ro_2 \leq 70$ and $100 \leq R_{th2} \leq 180$.

7. The vertical alignment mode liquid crystal display of claim 1, wherein a light transmittance of the first optical film and a light transmittance of the second optical film are different.

8. The vertical alignment mode liquid crystal display of claim 1, wherein a light transmittance of the first optical film is smaller than a light transmittance of the second optical film.

9. The vertical alignment, mode liquid crystal display of claim 1, wherein the first optical film and the second optical film each comprises a cellulose ester as a main component.

10. The vertical alignment mode liquid crystal display of claim 1, wherein the first optical film and the second optical film each are adhered to a polarizer via a saponification treatment.

* * * * *